(12) United States Patent
Lorch et al.

(10) Patent No.: US 8,019,818 B2
(45) Date of Patent: Sep. 13, 2011

(54) COMMUNICATIONS NETWORK SYSTEM AND METHODS FOR USING SAME

(75) Inventors: Yoav Lorch, Ramat-HaSharon (IL); Ehud Spiegel, Petach-Tikva (IL); Yossef Ilkanaev, Pardes Chana-Karkur (IL); Yaacov Fenster, Petach-Tikva (IL); Andrew Weinstein, Efrat (IL)

(73) Assignee: Zlango Ltd., Tel-Aviv (IL)

( * ) Notice: Subject to any disclaimer, the term of this patent is extended or adjusted under 35 U.S.C. 154(b) by 0 days.

(21) Appl. No.: 12/087,783

(22) PCT Filed: Jan. 16, 2007

(86) PCT No.: PCT/IB2007/050142
§ 371 (c)(1),
(2), (4) Date: Jul. 15, 2008

(87) PCT Pub. No.: WO2007/080558
PCT Pub. Date: Jul. 19, 2007

(65) Prior Publication Data
US 2009/0013087 A1   Jan. 8, 2009

Related U.S. Application Data

(63) Continuation-in-part of application No. PCT/IL2006/000061, filed on Jan. 16, 2006, and a continuation-in-part of application No. PCT/IL2006/000062, filed on Jan. 16, 2006, application No. 12/087,783.

(60) Provisional application No. 60/807,855, filed on Jul. 20, 2006, provisional application No. 60/807,863, filed on Jul. 20, 2006.

(30) Foreign Application Priority Data

Jan. 16, 2006 (IL) .......................................... 173169

(51) Int. Cl.
*G06F 15/16* (2006.01)
*G06F 12/00* (2006.01)
(52) U.S. Cl. ....................................... 709/205; 345/418
(58) Field of Classification Search .......... 709/245–250, 709/217–218, 203–205, 227–229; 345/418
See application file for complete search history.

(56) References Cited

U.S. PATENT DOCUMENTS

| 3,100,434 A | 8/1963 | Bunn |
| 3,218,175 A | 11/1965 | Siegel et al. |
| 3,352,460 A | 11/1967 | Herring |

(Continued)

FOREIGN PATENT DOCUMENTS

CH           456885          5/1968

(Continued)

OTHER PUBLICATIONS

Communication Pursuant to Article 94(3) EPC Dated Jan. 14, 2008 From the European Patent Office Re.: Application No. 05703094.2.

(Continued)

*Primary Examiner* — Zarni Maung

(57) ABSTRACT

A communications network system, comprising: a first user device, wherein the first user device uses a first communications protocol; a second user device, wherein the second user device uses a second communications protocol, different from the first communications protocol; and, a server, in operative communication with the first user device and the second user device, and wherein the server comprises a processor for translating the first communications protocol into the second communications protocol.

17 Claims, 8 Drawing Sheets

U.S. PATENT DOCUMENTS

| | | | |
|---|---|---|---|
| 3,634,107 A | 1/1972 | Cornelius | |
| 3,791,932 A | 2/1974 | Schuurs et al. | |
| 3,839,153 A | 10/1974 | Schuurs et al. | |
| 3,850,578 A | 11/1974 | McConnell | |
| 3,850,752 A | 11/1974 | Schuurs et al. | |
| 3,853,987 A | 12/1974 | Dreyer | |
| 3,867,517 A | 2/1975 | Ling | |
| 3,879,262 A | 4/1975 | Schuurs et al. | |
| 3,901,654 A | 8/1975 | Gross | |
| 3,935,074 A | 1/1976 | Rubenstein et al. | |
| 3,984,533 A | 10/1976 | Uzgiris | |
| 3,996,345 A | 12/1976 | Ullman et al. | |
| 4,034,074 A | 7/1977 | Miles | |
| 4,098,876 A | 7/1978 | Piasio et al. | |
| 4,626,540 A | 12/1986 | Capps et al. | |
| 4,651,862 A | 3/1987 | Greenfield | |
| 4,666,828 A | 5/1987 | Gusella | |
| 4,683,202 A | 7/1987 | Mullis | |
| 4,753,370 A | 6/1988 | Rudick | |
| 4,801,531 A | 1/1989 | Frossard | |
| 4,873,316 A | 10/1989 | Meade et al. | |
| 4,879,219 A | 11/1989 | Wands et al. | |
| 4,970,233 A | 11/1990 | McHugh | |
| 4,993,593 A | 2/1991 | Fabiano | |
| 5,011,771 A | 4/1991 | Bellet et al. | |
| 5,192,659 A | 3/1993 | Simons | |
| 5,260,795 A | 11/1993 | Sakai et al. | |
| 5,272,057 A | 12/1993 | Smulson et al. | |
| 5,281,521 A | 1/1994 | Trojanowski et al. | |
| 5,445,287 A | 8/1995 | Center et al. | |
| 5,498,757 A | 3/1996 | Johnson et al. | |
| 5,556,744 A | 9/1996 | Weiner et al. | |
| 5,570,816 A | 11/1996 | LaBarbera, Jr. | |
| 5,584,070 A | 12/1996 | Harris et al. | |
| 5,659,041 A | 8/1997 | Pollak et al. | |
| 5,666,159 A | 9/1997 | Parulski et al. | |
| 5,688,561 A | 11/1997 | Ichikawa et al. | |
| 5,729,289 A | 3/1998 | Etoh | |
| 5,778,189 A | 7/1998 | Kimura et al. | |
| 5,797,313 A | 8/1998 | Rothley | |
| 5,808,276 A | 9/1998 | Padilla | |
| 5,817,231 A | 10/1998 | Souza | |
| 5,858,437 A | 1/1999 | Anson | |
| 5,880,731 A | 3/1999 | Liles et al. | |
| 5,975,365 A | 11/1999 | Hsieh | |
| 5,991,807 A * | 11/1999 | Schmidt et al. | 709/225 |
| 5,999,541 A | 12/1999 | Hinchey et al. | |
| 6,022,222 A | 2/2000 | Guinan | |
| 6,044,248 A | 3/2000 | Mochizuki et al. | |
| 6,104,430 A | 8/2000 | Fukuoka | |
| 6,118,933 A | 9/2000 | Roberson | |
| 6,148,717 A | 11/2000 | Lassota | |
| 6,166,734 A * | 12/2000 | Nahi et al. | 715/748 |
| 6,167,441 A | 12/2000 | Himmel | |
| 6,173,117 B1 | 1/2001 | Clubb | |
| 6,188,431 B1 | 2/2001 | Oie | |
| 6,400,729 B1 | 6/2002 | Shimadoi et al. | |
| 6,434,564 B2 | 8/2002 | Ebert | |
| 6,654,725 B1 | 11/2003 | Langheinrich et al. | |
| 6,785,730 B1 * | 8/2004 | Taylor | 709/230 |
| 6,810,149 B1 | 10/2004 | Squilla et al. | |
| 6,987,991 B2 | 1/2006 | Nelson | |
| 6,990,452 B1 | 1/2006 | Ostermann et al. | |
| 7,035,387 B2 | 4/2006 | Russell et al. | |
| 7,052,396 B2 | 5/2006 | Comair | |
| 7,503,009 B2 * | 3/2009 | Peters | 715/764 |
| 7,548,849 B2 | 6/2009 | Fux et al. | |
| 7,565,404 B2 | 7/2009 | Gwozdz | |
| 7,571,213 B2 | 8/2009 | Walkush et al. | |
| 7,624,149 B2 | 11/2009 | Sheppard et al. | |
| 7,647,560 B2 | 1/2010 | Macauley et al. | |
| 7,669,135 B2 | 2/2010 | Cunningham et al. | |
| 7,792,981 B2 * | 9/2010 | Taylor | 709/230 |
| 2001/0049283 A1 | 12/2001 | Thomas | |
| 2001/0050914 A1 | 12/2001 | Akahane et al. | |
| 2002/0001295 A1 | 1/2002 | Park | |
| 2002/0032582 A1 | 3/2002 | Feeney, Jr. et al. | |
| 2002/0065088 A1 | 5/2002 | Seignol et al. | |
| 2002/0152896 A1 | 10/2002 | Young et al. | |
| 2003/0025802 A1 | 2/2003 | Mayer, Jr. et al. | |
| 2003/0045355 A1 | 3/2003 | Comair | |
| 2003/0084121 A1 | 5/2003 | De Boor et al. | |
| 2003/0130484 A1 | 7/2003 | Gordon et al. | |
| 2003/0174242 A1 | 9/2003 | Carmi et al. | |
| 2003/0225155 A1 | 12/2003 | Fernandez-Pol et al. | |
| 2004/0015547 A1 | 1/2004 | Griffin et al. | |
| 2004/0052928 A1 | 3/2004 | Gazit | |
| 2004/0192312 A1 | 9/2004 | Li et al. | |
| 2005/0020809 A1 | 1/2005 | Gazit | |
| 2005/0071364 A1 | 3/2005 | Xie et al. | |
| 2005/0101338 A1 | 5/2005 | Kraft | |
| 2005/0150393 A1 | 7/2005 | Biderman et al. | |
| 2005/0176454 A1 * | 8/2005 | Chakraborty et al. | 455/518 |
| 2005/0192078 A1 | 9/2005 | Jawaharlal | |
| 2006/0015560 A1 | 1/2006 | MacAuley et al. | |
| 2006/0025220 A1 | 2/2006 | Macauley et al. | |
| 2006/0150821 A1 | 7/2006 | Paul et al. | |
| 2006/0157463 A1 | 7/2006 | Wiele et al. | |
| 2006/0234947 A1 | 10/2006 | Gazit | |
| 2006/0278093 A1 | 12/2006 | Biderman et al. | |
| 2006/0282503 A1 | 12/2006 | Gwozdz | |
| 2007/0021345 A1 | 1/2007 | Gazit | |
| 2007/0135334 A1 | 6/2007 | Gazit | |
| 2007/0138007 A1 | 6/2007 | Yemini et al. | |
| 2008/0082678 A1 | 4/2008 | Lorch et al. | |
| 2008/0216022 A1 | 9/2008 | Lorch | |
| 2009/0013087 A1 | 1/2009 | Lorch et al. | |
| 2009/0156471 A1 | 6/2009 | Gazit et al. | |
| 2010/0179991 A1 | 7/2010 | Lorch et al. | |
| 2011/0004694 A1 * | 1/2011 | Taylor | 709/230 |

FOREIGN PATENT DOCUMENTS

| | | |
|---|---|---|
| DE | 3412445 | 10/1985 |
| DE | 3511159 | 10/1986 |
| DE | 10043282 | 3/2002 |
| DE | 10321094 | 11/2004 |
| EP | 0081122 | 6/1983 |
| EP | 0264166 | 4/1988 |
| EP | 0650125 | 4/1995 |
| EP | 0472361 | 4/1996 |
| EP | 0771096 | 5/1997 |
| EP | 0869464 | 10/1998 |
| EP | 0885904 | 12/1998 |
| EP | 0975132 | 1/2000 |
| EP | 1215867 | 6/2002 |
| GB | 2019813 | 11/1979 |
| GB | 2289555 | 11/1995 |
| GB | 2405602 | 3/2005 |
| JP | 59-044313 | 3/1984 |
| JP | 02-295923 | 12/1990 |
| JP | 2000-193661 | 7/2000 |
| JP | 2001-504334 | 4/2001 |
| WO | WO 2005/081552 | 9/2005 |
| WO | WO 2006/075334 | 7/2006 |
| WO | WO 2006/075335 | 7/2006 |
| WO | WO 2007/080557 | 7/2007 |
| WO | WO 2007/080558 | 7/2007 |
| WO | WO 2007/080559 | 7/2007 |

OTHER PUBLICATIONS

Communication Pursuant to Article 94(3) EPC Dated Apr. 21, 2009 From the European Patent Office Re.: Application No. 05703094.2.
Communication Pursuant to Article 94(3) EPC Dated Nov. 26, 2008 From the European Patent Office Re.: Application No. 05703094.2.
Communication Pursuant to Article 94(3) EPC Dated Jun. 30, 2008 From the European Patent Office Re.: Application No. 05703094.2.
Examination Report Dated Jan. 8, 2008 From the Government of India, Patent Office Re.: Application No. 1671/CHENP/2004.
Examination Report Dated Jun. 19, 2007 of the Government of India, Patent Office Re.: Application No. 1671/CHENP/2004.
Examiner's Report Dated Feb. 17, 2009 From the Australian Government, IP Australia Re.: Application No. 2004203461.
Examiner's Report Dated Feb. 22, 2008 From the Australian Government, IP Australia Re.: Application No. 2004203461.
Examiner's Report Dated Jun. 22, 2009 From the Australian Government, IP Australia Re.: Application No. 2004203461.

International Search Report Dated Mar. 5, 2009 From the International Searching Authority Re.: Application No. PCT/IB07/50143.
International Preliminary Report on Patentability Dated Apr. 9, 2009 From the International Bureau of WIPO Re.: Application No. PCT/IL2007/000982.
International Preliminary Report on Patentability Dated Jan. 22, 2009 From the International Bureau of WIPO Re.: Application No. PCT/IL2004/000577.
International Preliminary Report on Patentability Dated Jan. 25, 2007 From the International Bureau of WIPO Re.: Application No. PCT/IL2005/000754.
International Preliminary Report on Patentability Dated Jul. 27, 2006 From the International Bureau of WIPO Re.: Application No. PCT/IL2005/000051.
International Search Report and the Written Opinion Dated Jul. 3, 2007 From the International Searching Authority Re.: Application No. PCT/IB2007/050141.
International Search Report and the Written Opinion Dated Oct. 5, 2005 From the International Searching Authority Re.: Application No. PCT/IL05/00051.
International Search Report and the Written Opinion Dated Aug. 7, 2008 From the International Searching Authority Re: Application No. PCT/IB07/50143.
International Search Report and the Written Opinion Dated Jun. 13, 2008 From the International Searching Authority Re.: Application No. PCT/IL07/00982.*
International Search Report and the Written Opinion Dated Aug. 15, 2008 From the International Searching Authority Re.: Application No. PCT/IB07/50142.*
International Search Report and the Written Opinion Dated Jun. 26, 2007 From the International Searching Authority Re.: Application No. PCT/IL06/00061.*
International Search Report Dated Jul. 19, 2004 From the International Searching Authority Re.: Application No. PCT/IL03/01045.*
Notice of Allowance Dated Apr. 21, 2009 From the US Patent and Trademark Office Re.: U.S. Appl. No. 10/755,289.*
Office Action Dated Feb. 1, 2009 From the Israeli Patent Office Re.: Application No. 163285 and Its Translation Into English.*
Office Action Dated Jun. 4, 2008 From the Israeli Patent Office Re.: Application No. 163285.*
Office Action Dated Nov. 5, 2009 From the Israel Patent Office Re. Application No. 172788 and Its Translation Into English.*
Office Action Dated Jan. 8, 2009 From the Israeli Patent Office Re.: Application No. 172788 and Its Translation Into English.*
Office Action Dated Jan. 23, 2009 From the State Intellectual Property Office of the People's Republic of China Re.: Application No. 200580008115.4.*
Official Action Dated May 2, 2008 From the US Patent and Trademark Office Re.: U.S. Appl. No. 11/656,542.*
Official Action Dated Sep. 2, 2008 From the US Patent and Trademark Office Re.: U.S. Appl. No. 11/471,657.*
Official Action Dated Jul. 5, 2007 From the US Patent and Trademark Office Re.: U.S. Appl. No. 11/471,657.*
Official Action Dated Sep. 10, 2007 From the US Patent and Trademark Office Re.: U.S. Appl. No. 11/471,657.*
Official Action Dated Jan. 11, 2010 From the US Patent and Trademark Office Re.: U.S. Appl. No. 12/087,783.*
Official Action Dated Dec. 12, 2008 From the US Patent and Trademark Office Re.: U.S. Appl. No. 11/656,542.*
Official Action Dated May 15, 2009 From the US Patent and Trademark Office Re.: U.S. Appl. No. 11/471,657.*
Official Action Dated Dec. 16, 2008 From the US Patent and Trademark Office Re.: U.S. Appl. No. 10/562,852.
Official Action Dated Apr. 19, 2006 From the US Patent and Trademark Office Re.: U.S. Appl. No. 10/901,243.
Official Action Dated Dec. 20, 2005 From the US Patent and Trademark Office Re.: U.S. Appl. No. 10/755,289.
Official Action Dated Aug. 21, 2009 From the US Patent and Trademark Office Re.: U.S. Appl. No. 10/562,852.
Official Action Dated Feb. 23, 2006 From the US Patent and Trademark Office Re.: U.S. Appl. No. 10/235,852.
Official Action Dated Nov. 28, 2009 From the US Patent and Trademark Office Re.: U.S. Appl. No. 11/499,690.

Response Dated Feb. 7, 2010 to Notice of the Reason for Rejection of Oct. 22, 2009 From the Korean Intellectual Property Office Re.: Application No. 2004-7011868.
Response Dated Jan. 14, 2010 to Notice of the Reason for Rejection of Oct. 22, 2009 From the Korean Intellectual Property Office Re.: Application No. 2004-7011868.
Response Dated Mar. 15, 2010 to Supplementary European Search Report and the European Search Opinion of Dec. 22, 2009 From the European Patent Office Re.: Application No. 06700649.4.
Search Results: STN File, Registry, RN 379722-40-4 and Following Dated Dec. 31, 2001 for the Australian Patent Application No. 2004203461.
Supplementary European Search Report and the European Search Opinion Dated Nov. 11, 2009 From the European Patent Office Re.: Application No. 07790037.1.
Supplementary European Search Report Dated Apr. 18, 2006 From the European Patent Office Re.: Application No. 03704977.2.
Supplementary European Search Report Dated Dec. 22, 2009 From the European Patent Office Re.: Application No. 06700649.4.
Supplementary European Search Report Dated Jul. 31, 2007 From the European Patent Office Re.: Application No. 05703094.2.
Supplementary Partial European Search Report Dated Mar. 26, 2007 From the European Patent Office re.: Appliction No. 05703094.2.
Translation of Notice of the Reason for Rejection Dated Oct. 22, 2009 From the Korean Intellectual Property Office Re.: Application No. 2004-7011868.
Translation of the Notice of Reason of Rejection Dated Jul. 11, 2008 From the Japanese Patent Office Re.: Application No. 2003-563456.
Anguiano et al. "Protofibrillar Islet Amyloid Polypeptide Permeabilizes Synthetic Vesicles by a Pore-Like Mechanism That May Be Relevant to Type II Diabetes", Biochemistry, 41: 11338-11343, 2002.
Arvinte et al. "The Structure and Mechanism of Formation of Human Calcitonin Fibrils", The Journal of Biological Chemistry, 268(9): 6415-6422, 1993.
Austin et al. "Medical Progress: Calcitonin. Physiology and Pathophysiology", The New England Journal of Medicine, 304(5): 269-278, 1981.
Ausubel et al. Current Protocols in Molecular Biology, 1(Suppl.63). Not to Be IDS'd as per Hadassa (Not Relevant): Apr. 5, 2006.
Balbach et al. "Supramolecular Structure in Full-Length Alzheimer's β-Amyloid Fibrils: Evidence for A Parallel β-Sheet Organization From Solid-State Nuclear Magnetic Resonance", Biophysical Journal, 83: 1205-1216, 2002.
Baltzer et al. "De Novo Design of Proteins—What Are the Rules?", Chemical Reviews, 101(10): 3153-3163, 2001.
Banerji et al. "A Lymphocyte-Specific Cellular Enhancer Is Located Downstream of the Joining Region in Immunoglobulin Heavy Chain Genes", Cell, 33: 729-740, 1983.
Bauer et al. "Interfacial Adsorption and Aggregation Associated Changes in Secondary Structure of Human Calcitonin Monitored by ATR-FTIR Spectroscopy", Biochemistry, 33: 12276-12282, 1994.
Benvenga et al. "Homology of Calcitonin With the Amyloid-Related Proteins", Journal of Endocrinological Investigation, 17: 119-122, 1994.
Berger et al. "Calcitonin-Like Immunoreactivity of Amyloid Fibrils in Medullary Thyroid Carcinomas", Virchows Archiv A Pathological Anatomy and Histopathology, 412: 543-551, 1988.
Bird et al. "Single-Chain Antigen-Binding Proteins", Science, 242(4877): 423-426, 1988.
Boerner et al. "Production of Antigen-Specific Human Monoclonal Antibodies From In Vitro-Primed Human Splenocytes", The Journal of Immunology, 147(1): 86-95, 1991.
Booth et al. "Instability, Unfolding and Aggregation of Human Lysozyme Variants Underlying Amyloid Fibrillogenesis", Nature, 385: 787-793, 1997. Not to Be IDS'd as per Hadassa (Not Relevant): Apr. 5, 2006.
Bursavich et al. "Designing Non-Peptide Peptidomimetics in the 21st Century: Inhibitors Targeting Comformational Ensembles", Journal of Medical Chemistry, 45(3): 541-558, 2002.

Byrne et al. "Mutiplex Gene Regulation: A Two-Tiered Approach to Transgene Regulation in Transgenic Mice", Proc. Natl. Acad. Sci. USA, 86: 5473-5477, 1989. Not to Be IDS'd as per Hadassa (Not Relevant): Apr. 5, 2006.

Calame et al. "Transcriptional Controlling Elements in the Immunoglobulin and T Cell Receptor Loci", Advances in Immunology, 43: 235-275, 1988. Not to Be IDS'd as per Hadassa (Not Relevant): Apr. 5, 2006.

Cherny et al. "The Formation of *Escherichia coli* Curli Amyloid Fibrils is Mediated by Prion-Like Peptide Repeats", Journal of Molecular Biology, 352(2): 245-252, 2005.

Chopin et al. "Analysis of Six Prophages in Lactococcus Lactis IL1403: Different Genetic Structure of Temperate and Virulent Phage Populations", Nucleic Acids Research, 29(3): 644-651, 2001.

Choplin "Computers and the Medicinal Chemist", Comprehensive Medicinal Chemistry, 4(Chap.17.2): 33-58, 1990.

Chou et al. "Conformational Parameters for Amino Acids in Helical, β-Sheet, and Random Coil Regions Calculated From Proteins", Biochemistry, 13(2): 211-222, 1974.

Claessens et al. "Review Commentary: π-π Interactions in Self-Assembly", Journal of Physical Organic Chemistry, 10: 254-272, 1997.

Cole et al. "Human Monoclonal Antibodies", Molecular &. Cellular Biochemistry, 62(2): 109-120, 1984. Not to Be IDS'd as per Hadassa (Not Relevant): Apr. 5, 2006.

Cole et al. "The EBV-Hybridoma Technique and Its Application to Human Lung Cancer", Monoclonal Antibodies and Cancer Therapy, Proceedings of the Roche-UCLA Symposium, Park City, Utah, p. 77-96, 1985.

Cooper "Selective Amyloid Staining As a Function of Amyloid Composition and Structure. Histochemical Analysis of the Alkaline Congo Red. Standardized Toluidine Blue, and Iodine Methods", Laboratory Investigation, 31(3): 232-238, 1974. Not to Be IDS'd as per Hadassa (Not Relevant): Apr. 5, 2006.

Copp "Endocrine Regulation of Calcium Metabolism", Annual Reviews in Physiology, 32: 61-86, 1970.

Cote et al. "Generation of Human Monoclonal Antibodies Reactive With Cellular Antigens", Proc. Natl. Acad. Sci. USA, 80: 2026-2030, 1983. Not to Be IDS'd as per Hadassa (Not Relevant): Apr. 5, 2006.

Coughlan et al. "Factors Influencing the Processing and Function of the Amyloid Beta Precursor Protein—A Potential Therapeutic Target in Alzheimer's Disease?", Pharmacology and Therapeutics, 86: 111-144, 2000. Not to Be IDS'd as per Hadassa (Not Relevant): Apr. 5, 2006.

Damas et al. "Review: TTR Amyloidosis—Structural Features Leading to Protein Aggregation and Their Implications on Therapeutic Strategies", Journal of Structural Biology, 130: 290-299, 2000. Not to Be IDS'd as per Hadassa (Not Relevant): Apr. 5, 2006.

Edlund et al. "Cell-Specific Expression of the Rat Insuline Gene: Evidence for Role of Two Distinct 5' Flanking Elements", Science, 230(4278): 912-916, 1985. Not to Be IDS'd as per Hadassa (Not Relevant): Apr. 5, 2006.

Ferrannini "Insulin Resistance Versus Insulin Deficiency in Non-Insulin-Dependent Diabetes Mellitus: Problems and Prospects", Endocrine Reviews, 19(4): 477-490, 1998. Not to Be IDS'd as per Hadassa (Not Relevant): Apr. 5, 2006.

Findeis "Approaches to Discovery and Characterization of Inhibitors of Amyloid Beta-Peptide Polymerization", Biochimica et Biophysica Acta, 1502: 76-84, 2000. Not to Be IDS'd as per Hadassa (Not Relevant): Apr. 5, 2006.

Findeis et al. "Modified-Peptide Inhibitors of Amyloid β-Peptide Polymerization", Biochemistry, 38: 6791-6800, 1999.

Fingl et al. "Inroduction: General Principles", The Pharmacological Basis of Therapeutics, 5th Ed., Sec.I(Chap.1): 1-53, 1975.

Fishwild et al. "High-Avidity Hum IgGκ Monoclonal Antibodies From a Novel Strain of Minilocus Transgenic Mice", Nature Biotechnology, 14: 845-851, 1996.

Forloni et al. "Anti-Amyloidogenic Activity of Tetracyclines: Studies in Vitro", FEBS Letters, 487(3): 404-407, 2001. Figs. 1,3.

Freshney "Animal Cell Culture—A Practical Approach", IRL Press. Not to Be IDS'd as per Hadassa (Not Relevant): Apr. 5, 2006.

Friedman "Chemistry, Nutrition, and Microbiology of D-Amino Acids", Journal of Agriculture and Food Chemistry, 47(9): 3457-3479, 1999.

Gait "Oligonucleotide Synthesis—A Practical Approach", IRL Press. Not to Be IDS'd as per Hadassa (Not Relevant): Apr. 5, 2006.

Gajdusek "Unconventional Viruses and the Origin and Disappearance of Kuru", Science, 197(4307): 943-960, 1977. Not to Be IDS'd as per Hadassa (Not Relevant): Apr. 5, 2006.

Gazit "A Possible Role for 'Phi'-Stacking in the Self-Assembly of Amyloid Fibrils", The FASEB Journal, 16: 77-83, 2002.

Gazit "Global Analysis of Tandem Aromatic Optapeptide Repeats: The Significance of the Aroma-Glycine Motif", Bioinformatics Discovery Note, 18(6): 880-883, 2002. Not to Be IDS'd as per Hadassa (Not Relevant): Apr. 5, 2006.

Gazit "The 'Correctly Folded' State of Proteins: Is it a Metastable State?", Angewandte Chemie, International Edition, 41(2): 257-259, 2002. Not to Be IDS'd as per Hadassa (Not Relevant): Apr. 5, 2006.

Gillard et al. "Controlling Self-Assembly", Chemical European Journal, 3(12): 1933-1940, 1997.

Gillmore et al. "Amyloidosis a Review of Recent Diagnostic and Therapeutic Developments", British Journal of Haematology, 99: 245-256, 1997.

Glenner "Amyloid Deposits and Amyloidosis. The Beta-Fibrilloses (First of Two Parts)", The New England Journal of Medicine, 302(23): 1283-1292, 1980.

Gorman et al. "Alzheimer Beta-Amyloid Peptides, Structures of Amyloid Fibrils and Alternate Aggregation Products", Biopolymers, 60: 381-394, 2001. Claims 1-16, 22-26, 70-80, 91-100.

Grateau "Le Curli du Coli: Une Variété Physiologique d'Amilose [Coli's Curli or How Amyloid Can be Physiological]", Médecine Sciences, 18(6-7): p. 664, 2002.

Häggqvist et al. "Medin: An Integral Fragment of Aortic Smooth Muscle Cell-Produced Lactadherin Forms the Most Common Human Amyloid", Proc. Natl. Acad. Sci. USA, 96: 8669-8674, 1999.

Han et al. "Technetium Complexes for the Quantitation of Brain Amyloid", Journal of the American Chemical Society, 118: 4506-4507, 1996.

Harlow et al. "Antibodies: A Laboratory Manual", Cold Spring Harbor Laboratory, P.III-IX, 1988.

Harrison et al. "Amyloid Peptides and Proteins in Review", Reviews in Physiology, Biochemistry and Pharmacology, 159: 1-77, 2007.

Hayden et al. "'A' Is for Amylin and Amyloid in Type 2 Diabetes Mellitus", JOP Journal of the Pancreas (Online), 2(4): 124-139, 2001.

Hoeppener et al. "The Complete Islet Amyloid Polypeptide Precursor Is Encoded by Two Exons", Biochemical & Biophysical Research Communications, 189: 1569-1577, 1993. Database, Accession No. S04016, 1993. Claims 1-16, 22-26.

Hoogenboom et al. "By-Passing Immunisation. Human Antibodies From Synthetic Repertoires of Germline $V_H$ Gene Segments Rearranged In Vitro", Journal of Molecular Biology, 227: 381-388, 1992.

Höppener et al. "Islet Amyloid and Type 2 Diabetes Mellitus", The New England Journal of Medicine, 343(6): 411-419, 2000.

Inbar et al. "Localization of Antibody-Combining Sites Within the Variable Portions of Heavy and Light Chains", Proc. Natl. Acad. Sci. USA, 69(9): 2659-2662, 1972.

Inglot "Comparison of the Antiviral Activity In Vitro of Some Non-Steroidal Anti-Inflammatory Drugs", Journal of General Virology, 4(2): 203-214, 1969.

Inouye et al "Synthesis and Biological Properties of the 10-Substituted Analogues of ACTH-(1-18)-NH2", Shionogi Research Laboratory, Fukushima-Ku, Osaka, p. 177-182, 1978.

Jelokhani-Niaraki et al "Changes in Conformation and Antimicrobial Properties Caused by Replacement of D-Amino Acids With α-Aminoisobutyric Acid in the Gramicidin Backbbone: Synthesis and Circular Dichroic Studies", Journal of the Chemical Society Perkin Transactions, 2: 1 187-1193, 1992.

Johnson et al. "Islet Amyloid, Islet-Amiloid Polypeptide, and Diabetes Mellitus", The New England Journal of Medicine, 321(8): 513-518, 1989.

Jones et al. "Replacing the Complementarity-Determining Regions in a Human Antibody With Those From a Mouse", Nature, 321: 522-525, 1986.

Kahn et al. "Islet Amyloid: A Long-Recognized But Underappreciated Pathological Feature of Type 2 Diabetes", Diabetes, 48: 241-253, 1999.

Kamihira et al. "Conformational Transitions and Fibrillation Mechanism of Human Calcitonin as Studied by High-Resolution Solid-State 13C NMR [in Process Citation]", Protein Science, 9: 867-877, 2000.

Kanaori et al. "Study of human Calcitonin Fibrillation by Proton Nuclear Magnetic Resonance Spectroscopy", Biochemistry, 34: 12138-12143, 1995.

Kapurniotu et al. "Structure-Based Design and Study of Non-Amyloidogenic, Double N-Methylated IAPP Amyloid Core Sequences as Inhibitors of IAPP Amyloid Formation and Cytotoxicity", Journal of Molecular Biology, 315: 339-350, 2002.

Kapurniotu et al. Database, Accession No. AAW93015, 1991.

Karle et al. "Structural Characteristics of α-Helical Peptide Molecules Contianing Aib Residues", Biochemistry, 29(29): 6747-6756, Jul. 24, 1990.

Kedar et al. "In Vitro Synthesis of 'Amyloid' Fibrils From Insulin, Calcitonin and Parathormone", Israel Journal of Medical Science, 12(10): 1137-1140, 1976.

Kilkarni et al. "Investigation of the Effect of Antisense Oligodeoxynucleotides to Islet Amyloid Polypeptide mRNA on Insulin Release, Content and Expression", Journal of Endocrinology, 151: 341-348, 1996.

Kohler et al. "Continuous Cultures of Fused Cells Secreting Antibody of Predefined Specifity", Nature, 256: 495-497. 1975.

Kozbor et al. "Specific Immunoglobulin Production and Enhanced Tumorigenicity Following Ascites Growth of Human Hybridomas", Journal of Immunological Methods, 81: 31-42, 1985.

Kuner et al. "Controlling Polmerization of Beta-Amyloid and Prion-Derived Peptides With Synthetic Smal Molecule Ligands", Journal of Biological Chemistry, 275(3): 1673-1678, 2000.

Kyte et al. "A Simple Method for Displaying the Hydropathic Character of a Protein", Journal of Molecular Biology, 157: 105-132, 1982.

Lansbury "Following Nature's Anti-Amyloid Strategy", Nature Biotechnology, 19(2): 112-113, 2001. P.112, Left-Hand col., Paragraph 1—Middle col., Paragraph 1.

Larrick et al. "PCR Amplification of Antibody Genes", Methods: A Companion to Methods in Enzymology, 2(2): 106-110, 1991.

Lonberg et al. "Antigen-Specific Human Antibodies From Mice Comprising Four Distinct Genetic Modifications", Nature, 368(6474): 856-859, 1994.

Lonberg et al. "Human Antibodies From Transgenic Mice", International Review of Immunology, 13: 65-93, 1995.

Lowe et al. "Structure-Function Relationships for Inhibitors of β-Amyloid Toxicity Containing the Recognition Sequence KLVFF", Biochemistry, 40: 7882-7889, 2001.

Lyon et al. "Self-Assembly and Gelation of Oxidized Gluthathione in Organic Solvents", Journal of the American Chemical Society, 123: 4408-4413, 2001.

Marks et al. "By-Passing Immunization—Human Antibodies From V-Gene Libraries Displayed on Phage", Journal of Molecular Biology, 222: 581-597, 1991.

Marks et al. "By-Passing Immunization: Building High Affinity Human Antibodies by Chain Shuffling", Bio/Technology, 10: 779-783, 1992.

Marshak et al. "Strategies for Protein Purification and Charcterization, A Laboratory Course Manual", Cold Spring Harbor Laboratory Press, 1996.

Maury et al. "Creation of Amyloid Fibrils From Mutant ASN187 Gelsolin Peptides", Biochemical and Biophysical Research Communications, 183(1): 227-231, 1992.

Mazor et al. "Identification and Characterization of a Novel Molecular-Recognition and Self-Assembly Domain Within the Islet Amyloid Polypeptide", Journal of Molecular Biology, 322: 1013-1024, 2002.

McGaughey et al. "Π-Stacking Interactions", The Journal of Biological Chemistry, 273(25): 15458-15463, 1998.

Medore et al. "Fatal Familial Insomnia, A Prion Disease With a Mutation at Codon 178 of the Prion Protein Gene", The New England Journal of Medicine, 326(7): 444-449, 1992.

Merlini et al. "Intereaction of the Anthracycline 4'-Iodo-4'-Deoxydoxorubicin With Amyloid Fibrils: Inhibition of Amyloidogenesis", Proc. Natl. Acad. Sci. USA, 92: 2959-2963, 1995.

Moriatry et al. "Effects of Sequential Proline Substitutions on Amoyloid Formation by Human Amylin20-29", Biochemistry, 38: 1811-1818, 1999.

Morrison "Success in Specification", Nature, 368(6474): 812-813, 1994.

Mosmann "Rapid Colorimetric Assay for Cellular Growth and Survival: Application to Proliferation and Cytotoxicity Assays", Journal of Immunological Methods, 65: 55-63, 1983.

Mosselman et al. "Islet Amyloid Polipeptide: Identification and Chromosomal Localization of the Human Gene", FEBS Letters, 239(2): 227-232, 1988. Not to Be IDS'd as per Hadassa (Not Relevant): Apr. 5, 2006.

Mosselman et al. "The Complete Islet Amyloid Polypeptide Precursor Is Encoded by Two Exons", FEBS Letters, 247: 154-158, 1989, Database Accession No. S04016.

Mutter "Studies on the Coupling Rates in Liquid-Phase Peptide Synthesis Using Competition Experiments", International Journal of Peptide Protein Research, 13: 274-277, 1979.

Neuberger "Generating High-Avidity Human Mabs in Mice", Nature Biotechnology, 14: 826, 1996.

Novials et al. "Reduction of Islet Amylin Expression and Basal Secretion by Adenovirus-Mediated Delivery of Amylin Antisense cDNA", Pancreas, 17(2): 182-186, 1998. Not to Be IDS'd as per Hadassa (Not Relevant): Apr. 5, 2006.

Offen et al. "A Low Molecular Weight Copper Chelator Crosses the Blood-Brain Barrier and Attenuates Experimental Autoimmune Encephalomyelitis", Journal of Neurochemistry, 89: 1241-1251, 2004.

Orlandi et al. "Cloning Immunoglobulin Variable Domains for Expression by the Polymerase Chain Reaction", Proc. Natl. Acad. Sci. USA, 86: 3833-3837, 1989. Not to Be IDS'd as per Hadassa (Not Relevant): Apr. 5, 2006.

Pack et al. "Improved Bivalent Miniantibodies, With Identical Avidity as Whole Anitbodies, Produced by High Cell Density Fermentation of Escherichia coli", Bio/Technology, 11: 1271-1277, 1993.

Pavia et al. "Antimicrobial Activity of Nicotine Against a Spectrum of Bacterial and Fungal Pathogens", Journal of Medical Microbiology, 49(7): 675-676, 2000.

Perbal "A Practical Guide to Molecular Cloning", Wiley-Interscience Publication. Not to Be IDS'd as per Hadassa (Not Relevant): Apr. 5, 2006.

Petkova et al. "A Structural Model for Alzheimer's β-Amyloid Fibrils Based on Experimental Constraints From Solid State NMR", Proc. Natl. Acad. Sci. USA, 99(26): 16742-16747, 2002.

Pettmann et al. "Morphological and Biochemical Maturation of Neurones Cultured in the Absence of Glial Cells", Nature, 281: 378-380, 1979.

Pinkert et al. "An Albumin Enhancer Located 10 Kb Upstream Functions Along With Its Promoter to Direct Efficient, Liver-Specific Expression in Transgenic Mice", Genes & Development, 1: 268-276, 1987.

Pispisa et al. "A Spectroscopic and Molecular Mechanics Investigation on a Series of AIB-Based Linear Peptides and a Peptide Template, Both Containing Tryptophan and a Nitroxide Derivative as Probes", Biopolymers, 53: 169-181, 2000.

Porter "The Hydrolysis of Rabbit γ-Globulin and Antibodies With Crystalline Papain", Biochemical Journal, 73: 119-126, 1959.

Presta "Antibody Engineering", Current Opinion in Structural Biology, 2: 593-596, 1992.

Puchtler et al. "A Review of Early Concepts of Amyloid in Context With Contemporary Chemical Literature From 1839 to 1859", The Journal of Histochemistry and Cytochemistry, 14(2): 123-134, 1966.

Reza et al "Self-Assembling Organic Nanotubes Based on a Cyclic Peptide Architecture", Nature, 366: 324-327, 1993.

Riechmann et al. "Reshaping Human Antibodies for Therapy", Nature, 332: 323-329, 1988.

Sambrook et al. "Molecular Cloning: A Laboratory Manual", 2nd Edition, Cold Spring Harbor Laboratory,1989.

Sano "Prevention of Alzheimer's Disease: Where We Stand", Current Neurology and Neuroscience Reports, 2(5): 392-399, Oct. 2002. Abstract.

Seino "S20G Mutation of the Amylin Gene Is Associated With Type II Diabetes in Japanes", Diabetologia, 44: 906-909, 2001.

Shetty et al. "Aromatic π-Stacking in Solution as Revealed Through the Aggregation of Phenylacetylene Macrocycles", Journal of the American Chemical Society, 118: 1019-1027, 1996.

Sigel-Causey et al. "Phylogeny of the Pelecaniformes: Molecular Systematics of a Privative Group", Avian Molecular Evolution and Systematics, academic Press, p. 159-171, NBCI GenBank, Accession No. AAB58518, 1997.

Sigma "Alphabetical List of Compounds: Phe-Phe, Phe-Pro, Phe-Val", Biochemicals and Reagents for Life Science Research, p. 774, 2000-2001.

Solomon et al. "Disaggregation of Alzheimer β-Amyloid by Site-Directed MAb", Proc. Natl. Acad. Sci. USA, 94: 4109-4112, 1997.

Soto et al. "Beta-Sheet Breaker Peptides Inhibit Fibrillogenesis in a Rat Brain Model of Amyloidosis: Implications for Alzheimer's Therapy", Nature Medicine, 4(7): 822-826, 1998.

Soto et al. "Inhibition of Alzheimer's Amyloidosis by Peptides That Prevent β-Sheet Conformation", Biochemical and Biophysical Research Communications, 226(3): 672-680, 1996.

Stephenson et al. "The 'Promiscuous Drug Concept' With Applications to Alzheimer's Disease", FEBS Letters, 579: 1338-1342, 2005.

Stites et al. "Tables of Content", Basic & Clinical Immunology, 8th Ed.: 12 P.

Sun et al. "Aromatic Van der Waals Clusters: Structure and Nonrigidity", Journal of Physical Chemistry, 100: 13348-13366, 1996.

Tenidis et al. "Identification of a Penta- and Hexapeptide of Islet Amyloid Polypeptide (IAPP) With Amyloidogenic and Cytotoxic Propereties", Journal of Molecular Biology, 295(4): 1055-1071, 2000.

Tjernberg et al. "Arrest of β-Amyloid Fibril Formation by a Pentapeptide Ligand", The Journal of Biological Chemistry, 271(15): 8545-8548, 1996.

Tjernberg et al. "Controlling Amyloid β-Peptide Fibril Formation With Protease-Stable Ligands", The Journal of Biological Chemistry, 272(19): 12601-12605, 1997.

Toniolo et al. "Control of Peptide Conformation by the Thorpe-Ingold Effect (Cα-Tetrasubstitution)", Biopolymers (Peptide Science), 60(6): 396-419, 2001.

Tonkinson et al. "Antisense Oligodeoxynucleotides as Clinical Therapeutic Agents", Cancer Investigation, 14(1): 54-65, 1996.

Tsai et al. "Synthesis of AIB-Containing Peptidomimetics as Potential Inhibitors of Alzheimer's γ-Secretase", 218th ACS National Meeting, New Orleans, USA, Meeting Abstract, MEDI-018, 1999. Abstract.

Verhoeyen et al. "Reshaping Human Antibodies: Grafting an Antilysozyme Activity", Science, 239: 1534-1536, 1988.

Vidal et al. "A Stop-Codon Mutation in the BRI Gene Associated With Familial British Dementia", Nature, 399: 776-781, 1999.

Westermark "Amyloid and Polypeptide Hormones: What is Their Interrelationship?", Amyloid: International Journal of Experimental & Clinical Investigation, 1: 47-60, 1994.

Westermark "Islet Amyloid Polypeptide: Pinpointing Amino Acid Residues Linked to Amyloid Fibril Formation", Proc. Natl. Acad. Sci. USA, 87: 5036-5040, 1990.

Whitlow et al. "Single-Chain Fv Proteins and Their Fusion Proteins", Methods: A Companion to Methods in Enzymology, 2(2): 97-105, 1991.

Wilesmith et al. "Bovine Spongiform Encephalopathy", Current Topics in Microbiology & Immunology, 172: 21-38, 1991.

Winoto et al. "A Novel, Inducible and T Cell-Specific Enhancer Located at the 3' End of the T Cell Receptor Alpha Locus", The EMBO Journal, 8(3): 729-733, 1989.

Winter et al. "Man-Made Antibodies", Nature, 349: 293-299, 1991. No.

Wolfenden et al. "Affinities of Amino Acid Side Chains for Solvent Water", Biochemistry, 20: 849-855, 1981.

Yamada et al. "Study of the Enzymatic Degradation of Endomorphin Analogs Containing α,α-Disubstituted Glycine", Peptide Science, 2000: 421-424, 2001.

Zaidi et al. "Forty Years of Calcitonin—Where Are We Now? A Tribute to the Work of Iain Macintyre, FRS", Bone, 30(5): 655-663, 2002.

International Preliminary Report on Patentability Dated Jul. 26, 2007 From the International Bureau of WIPO Re.: Application No. PCT/IL2006/000061.

International Preliminary Report on Patentability Dated Jan. 29, 2009 From the International Bureau of WIPO Re.: Application No. PCT/IB2007/050142.

International Preliminary Report on Patentability Dated Jul. 31, 2008 From the International Bureau of WIPO Re.: Application No. PCT/IB2007/050141.

International Search Report and the Written Opinion Dated Feb. 28, 2008 From the International Searching Authority Re.: Application No. PCT/IL06/00062.

Invitation to Pay Additional Fees Dated Jan. 31, 2007 From the International Searching Authority Re.: Application No. PCT/IL06/00061.

International Search Report and the Written Opinion Dated Mar. 28, 2006 From the International Searching Authority Re.: Application No. PCT/IL2005/000754.

Re-Issued International Search Report dated Mar. 5, 2009 From the International Searching Authority Re.: U.S. Appl. No. PCT/IB07/50143.

Response Dated Mar. 11, 2010 to Official Action of Jan. 11, 2010 From the US Patent and Trademark Office Re.: U.S. Appl. No. 12/087,783.

Supplementary European Search and European Search Opinion Dated May 21, 2010 From the European Patent Office Re. Application No. 06700648.6.

Official Action Dated Jul. 7, 2010 From the US Patent and Trademark Office Re. U.S. Appl. No. 11/795,319.

Official Action Dated Jul. 21, 2010 From the US Patent and Trademark Office Re. U.S. Appl. No. 11/795,318.

Official Action Dated Sep. 2, 2010 From the US Patent and Trademark Office Re.: U.S. Appl. No. 12/087,782.

Official Action Dated Jan. 19, 2011 From the US Patent and Trademark Office Re. U.S. Appl. No. 11/795,319.

Response Dated Jan. 20, 2011 to Official Action of Jul. 21, 2010 From the US Patent and Trademark Office Re. U.S. Appl. No. 11/795,318.

Response Dated Feb. 21, 2011 to Official Action of Jan. 19, 2011 From the US Patent and Trademark Office Re. U.S. Appl. No. 11/795,319.

International Preliminary Report on Patentability Dated Jul. 31, 2008 From the International Bureau of WIPO Re.: Application No. PCT/IB2007/050141.

Examiner's Report Dated Feb. 17, 2008 From the Australian Government, IP Australia Re.: Application No. 2004203461.

Examiner's Report Dated Feb. 22, 2008 From the Australian Government, IP Australia Re.: Application No. 2004203461.

Examiner's Report Dated Jun. 22, 2009 From the Australian Government, IP Australia Re.: Application No. 2004203461.

International Preliminary Report on Patentability Dated Apr. 9, 2009 From the International Bureau of WIPO Re.: Application No. PCT/IL2007/000982.

International Preliminary Report on Patentability Dated Jan. 22, 2009 From the International Bureau of WIPO Re.: Application No. PCT/IL2004/000577.

International Preliminary Report on Patentability Dated Jan. 25, 2007 From the International Bureau of WIPO Re.: Application No. PCT/IL2005/000754.

International Preliminary Report on Patentability Dated Jul. 27, 2006 From the International Bureau of WIPO Re.: Application No. PCT/IL2005/000051.

International Search Report and the Written Opinion Dated Jul. 3, 2007 From the International Searching Authority Re.: Application No. PCT/IB2007/050141.

International Search Report and the Written Opinion Dated Oct. 5, 2005 From the International Searching Authority Re.: Application No. PCT/IL05/00051.

International Search Report and the Written Opinion Dated Aug. 7, 2008 From the International Searching Authority Re: Application No. PCT/IB07/50143.

Official Action Dated Jun. 1, 2010 From the US Patent and Trademark Office Re.: U.S. Appl. No. 12/087,783.
Official Action Dated Nov. 18, 2009 From the US Patent and Trademark Office Re.: U.S. Appl. No. 11/499,690.
Re-Issued International Search Report Dated Mar. 5, 2009 From the International Searching Authority Re.: Application No. PCT/IB07/50143.
Response Dated Nov. 8, 2010 to Official Action of Jul. 7, 2010 From the US Patent and Trademark Office Re. U.S. Appl. No. 11/795,319.
Ausubel et al. Current Protocols in Molecular Biology, 1(Suppl.63).
Balbach et al. "Supramolecular Structure in Full-Length Alzheimer's ?-Amyloid Fibrils: Evidence for a Parallel ?-Sheet Organization From Solid-State Nuclear Magnetic Resonance", Biophysical Journal, 83: 1205-1216, 2002.
Claessens et al. "Review Commentary: ?-? Interactions in Self-Assembly", Journal of Physical Organic Chemistry, 10: 254-272, 1997.
Findeis et al. "Modified-Peptide Inhibitors of Amyloid ?-Peptide Polymerization", Biochemistry, 38: 6791-6800, 1999.
Fishwild et al. "High-Avidity Hum IgG? Monoclonal Antibodies From A Novel Strain of Minilocus Transgenic Mice", Nature Biotechnology, 14: 845-851, 1996.
Grateau "Le Curli du Coli: Une Vari?t? Physiologique d'Amilose [Coli's Curli or How Amyloid can be Physiological]", M?decine Sciences, 18(6-7): p. 664, 2002.
H?ppener et al. "Islet Amyloid and Type 2 Diabetes Mellitus", The New England Journal of Medicine, 343(6): 411-419, 2000.
Hoogenboom et al. "By-Passing Immunisation. Human Antibodies From Synthetic Repertoires of Germline V? Gene Segments Rearranged In Vitro", Journal of Molecular Biology, 227: 381-388, 1992.
Karle et al. "Structural Characteristics of ?-Helical Peptide Molecules Contianing Aib Residues", Biochemistry, 29(29): 6747-6756, 24 Jul. 1990.
Lowe et al. "Structure-Function Relationships for Inhibitors of ?-Amyloid Toxicity Containing the Recognition Sequence KLVFF", Biochemistry, 40: 7882-7889, 2001.
McGaughey ct al. "?-Stacking Interactions. Alive and Well in Proteins", The Journal of Biological Chemistry, 273(25): 15458-15463, Jun. 19, 1998.
Porter "The Hydrolysis of Rabbit ?-Globulin and Antibodies With Crystalline Papain", Biochemical Journal, 73: 119-126, 1959.

Seino "S2OG Mutation of the Amylin Gene Is Associated With Type II Diabetes in Japanes", Diabetologia, 44: 906-909, 2001.
Shetty et al. "Aromatic ?-Stacking in Solution as Revealed Through the Aggregation of Phenylacetylene Macrocycles", Journal of the American Chemical Society, 118: 1019-1027, 1996.
Solomon et al. "Disaggregation of Alzheimer ?-Amyloid by Site-Directed MAb", Proc. Natl. Acad. Sci. USA, 94: 4109-4112, 1997.
Soto et al. "Inhibition of Alzheimer's Amyloidosis by Peptides That Prevent ?-Sheet Conformation", Biochemical and Biophysical Research Communications, 226(3): 672-680, 1996.
Tjernberg et al. "Arrest of ?-Amyloid Fibril Formation by A Pentapeptide Ligand", The Journal of Biological Chemistry, 271(15): 8545-8548, 1996.
Tjernberg et al. "Controlling Amyloid ?-Peptide Fibril Formation With Protease-Stable Ligands", The Journal of Biological Chemistry, 272(19): 12601-12605, 1997.
Tsai et al. "Synthesis of AIB-Containing Peptidomimetics as Potential Inhibitors of Alzheimer's ?-Secretase", 218th ACS National Meeting, New Orleans, USA, Meeting Abstract, MEDI-018, 1999. Abstract.
Yamada et al. "Study of the Enzymatic Degradation of Endomorphin Analogs Containing ?,?-Disubstituted Glycine", Peptide Science, 2000: 421-424, 2001.
Response Dated Dec. 8, 2010 to Supplementary European Search and European Search Opinion Dated May 21, 2010 From the European Patent Office Re. Application No. 06700648.6.
Response Dated Feb. 2, 2011 to Official Action of Sep. 2, 2010 From the US Patent and Trademark Office Re.: U.S. Appl. No. 12/087,782.
Official Action Dated Apr. 19, 2011 From the US Patent and Trademark Office Re. U.S. Appl. No. 11/795,319.
Official Action Dated May 3, 2011 From the US Patent and Trademark Office Re.: U.S. Appl. No. 12/087,782.
Official Action Dated Apr. 8, 2011 From the US Patent and Trademark Office Re. U.S. Appl. No. 11/795,318.
Offica Action Dated Apr. 7, 2011 From the Israel Patent Office Re. Application No. 40673 and Its Translation Into English.
Office Action Dated Apr. 5, 2011 From the Israel Patent Office Re. Application No. 184644 and Its Translation Into English.

* cited by examiner

COMMUNICATIONS NETWORK SYSTEM AND METHODS FOR USING SAME

RELATED APPLICATIONS

This Application is a National Phase of PCT Patent Application No. PCT/IB2007/050142 having International filing date of Jan. 16, 2007, which is a Continuation-in-Part of PCT application No. PCT/IL2006/000061, filed on Jan. 16, 2006 and entitled "Iconic Communication", which is a 119 (e) of 60/644,021, filed Jan. 18, 2005. PCT/IB2007/050142 is also a Continuation-in-Part of PCT application No. PCT/IL2006/000062, filed on Jan. 16, 2006 and entitled "Communications Network System and Methods for Using Same".

PCT/IB2007/050142 also claims the benefit under 119(e) of the following US Provisional applications: 60/807,855 filed on Jul. 20, 2006 entitled "Communication Network System and Methods for Using Same" and 60/807,863 filed on Jul. 20, 2006 entitled "Iconic Communication".

PCT/IB2007/050142 is related to Israel Application No. IL 166322, filed on Jan. 16, 2005, entitled "Method and System for Iconic Language Communication" and Israel application No. 173169, filed on Jan. 16, 2006 and entitled "Communications Network System and Methods for Using Same".

This application is also related to PCT Patent Application Nos. PCT/IB2007/050143 filed on Jan. 16, 2007 and PCT/IB2007/050141 filed on Jan. 16, 2007.

The disclosures of the above applications are incorporated herein by reference.

FIELD OF THE INVENTION

The present invention relates to the field of communication, and more specifically to a communications network system and methods for using same.

BACKGROUND OF THE INVENTION

In the past few years, advancing technology has given people the ability to communicate as never before. For example, the advent of cellular communications networks, the Internet and other communications media make for quick and convenient means of conveying information from one person to another.

However, there are multiple competing technologies offering enhanced communication abilities, and often times each technology has multiple competing formats and/or protocols for carrying out that technology. As a result, interoperability of these systems, devices, formats, protocols and/or networks is a serious concern. In addition, some of these technologies utilize devices with limited input capabilities, which in turn reduce the efficiency of communicating through these devices. Electronic messaging is one area where the reduced efficiency may be burdensome to a user. Some types of electronic messaging, such as SMS, operate in nearly real-time. A typical message will include multiple text characters. However, these messages are often sent using devices with limited input capability, such as cellular telephones which usually only have 12 keys. Entering multiple keystrokes to generate each text character may lead to a delay in responding to a message. This, in turn, may cause recipients to wait longer when receiving an instant message due to a user inputting characters on a limited input device. In a nearly real-time communication environment, such delay may be unacceptable. Furthermore, none of these new communications technologies are particularly helpful for communication across language barriers.

U.S. published patent application 2002/0140732, the disclosure of which is herein incorporated by reference, describes a method, system and storage medium for an iconic language communication tool. The system includes a host system for generating an iconic language communication template for receiving a user icon selection, presenting the iconic language communication template and receiving the user icon selection from the iconic language communication template. A network and a database are in communication with the host system.

U.S. published patent application 2002/0184309, the disclosure of which is herein incorporated by reference, describes systems and methods for reducing the amount of input a user is required to enter for an electronic message. When users change their capability to engage in an electronic messaging session, for instance when they go off-line, a command may be sent to other users. This command may take the form of a character sequence not normally occurring in the written language, which is interpreted by network devices and changes the display of the icon associated with the user who has gone off-line.

SUMMARY OF THE INVENTION

An aspect of some exemplary embodiments of the invention relates to providing a communications network system which is capable of interoperable use with a plurality of protocols such as services, types of devices, formats and/or communications networks. In some exemplary embodiments of the invention, a sender of data in a first protocol has the data received by a receiver in a second protocol. In an exemplary embodiment of the invention, the data sent in the first protocol is translated into a second protocol by the communications network system by using a first header and at least a portion of the contents of the data. Optionally, the first header and at least a portion of the data are used to construct a second header for the data which is compatible with the second protocol. In some exemplary embodiments of the invention, the communications network system is used for transmitting an iconic language, optionally in a ZMS protocol (e.g. an SMS protocol wherein the messages contain iconic language content). In some exemplary embodiments of the invention, the communications network system is used for transmitting data and/or messages which are capable of activating software applications on a recipient's user device. Optionally, transmission of messages is conducted using at least some SMS messages.

An aspect of some exemplary embodiments of the invention relates to providing a communications network system which provides at least one group of iconic language icons to at least one user group associated with that group of iconic language icons. In some exemplary embodiments of the invention, a single icon is associated with more than one group of iconic language icons thereby allowing the single icon to be simultaneously provided to more than one user group. In some exemplary embodiments of the invention, a group of iconic language icons is associated with more than one group of users thereby allowing the group of iconic language icons to be simultaneously provided to more than one group of users. Optionally, a group of users is associated with more than one group of iconic language icons thereby providing the group of users with more than just one group of iconic language icons. In some exemplary embodiments of the invention, the data is provided to at least one group of users from a server. Optionally, the data is provided to at least one group of users from a user. Optionally, the user providing the data is a member of the at least one group of user.

An aspect of some exemplary embodiments of the invention relates to providing a communications network system which conducts statistical analysis of messages transmitted at least partially in an iconic language and transmitted within the system. In some exemplary embodiments of the invention, messages are analyzed to gauge frequency and/or context of icon use. Optionally, analysis is conducted on messages to determine how much and/or in what relation certain icons are used with other icons. In some exemplary embodiments of the invention, statistical analysis is performed on an ongoing basis rather than a periodic basis. Optionally, analysis is conducted on user message-related preferences such as font size used, font used, colors used, and/or graphics used. In some exemplary embodiments of the invention, statistical analysis is used to determine which individual icons, groups of icons and/or other preferences are presented to users by default and/or are selectable for use by users. Optionally, statistical analysis is used for predicting yet-to-be-entered message content based on what message content has already been entered.

An aspect of some exemplary embodiments of the invention relates to providing a communications network system which optimizes message size based on the contents of the message. Optionally, the message is comprised of application data. Optionally, the message is transmitted via SMS. In some exemplary embodiments of the invention, content items are reduced to their minimum necessary size in order to optimize overall message size. Optionally, the communications network system analyzes message contents and automatically optimizes the message size prior to transmission to a receiver.

An aspect of some exemplary embodiments of the invention relates to a method for a communications network system to determine if a software application client installed on a user device is active. In an exemplary embodiment of the invention, an active software application client is generally considered to be one that is open on a user device and an inactive software application client is generally considered to be one that is closed on a user device. Optionally, a software application client is considered to be open if the user device is actively polling a server. Optionally, a software application client is considered to be open if the user device polled a server within a predefined period of time. Optionally, a software application client is considered to be closed if the user device hasn't polled the server for at least a predefined period of time. In some exemplary embodiments of the invention, the software application client sends a signal to a server that the client is opening or closing.

An aspect of some exemplary embodiments of the invention relates to providing an adaptive mixed operation mode which permits communication between users without using an intermediate application server (i.e. is a direct connection using only at least one transmission server) or alternatively uses an intermediate application server if at least one of the devices is determined to be incapable of communicating using a direct connection and at least some application aspects are performed on the intermediate application server. In some embodiments of the invention, a database is maintained which indicates a communication device's ability to operate using a direct connection. Optionally, ability is determined by the functionality of the software client installed on the device. Additionally or alternatively, ability is determined by the capabilities of the hardware of the device. In some embodiments of the invention, when a direct connection capable device initiates a session with a device which is incapable of sustaining a direct connection, the user of the incapable device is prompted to upgrade the functionality of the device.

An aspect of some exemplary embodiments of the invention relates to using an embedded field in SMS messages which invokes an HTTP session for content retrieval from an address indicated in the embedded field. The content can be normal-size ZMS (like an ordinary SMS including headers), large ZMS (larger than an ordinary SMS), new icons, and/or text. For SMS-only user devices, the ZRL is sent over SMS to the server and the server sends back a ZMS over ZMS (transparently opened by the client). In an embodiment of the invention, using HTTP for transferring content allows for delivery of larger amounts of information to the user device than would conventionally be possible.

An aspect of some exemplary embodiments of the invention relates to providing a content exchange location for upgrading and/or updated and/or extending the capabilities and/or features of a user device. In some embodiments of the invention, the content exchange location is accessible via a network connection to at least one of a user, a group of users, a service provider, a third party and/or other party interested in creating, uploading and/or downloading content from the content exchange location. In some embodiments of the invention, an iconic language is extended (enhanced with more available icons) by the user retrieving at least one additional icon from the content exchange location and/or displaying and/or storing the at least one additional icon on the user's device. There is thus provided in accordance with an exemplary embodiment of the invention, a communications network system, comprising: a first user device, wherein said first user device uses a first communications protocol for transmission of data with a first header attached; a second user device, wherein said second user device uses a second communications protocol for transmission of data, different from said first communications protocol; and, a server, in operative communication with said first user device and said second user device, and wherein the server comprises a processor that uses the first header and at least some of the data content compatible with the first communications protocol to create a second header compatible with the second communications protocol. In some exemplary embodiments of the invention, the system further comprises a plurality of communications protocols from which said first communications protocol and said second communications protocol are selected. Optionally, the first communications protocol is selected from an exemplary group comprised of Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G. Optionally, the second communications protocol is selected from an exemplary group comprised of Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G.

There is further provided in accordance with an exemplary embodiment of the invention, a communications network system, comprising: a first user device, wherein the first user device uses a first communications protocol for transmission of data, the data capable of activating a software application installed on a user device; a second user device, wherein the second user device uses a second communications protocol for receipt of the data; and, a server, in operative communication with the first user device and the second user device, and wherein the server comprises a processor that translates the first communications protocol into the second communications protocol by changing at least a data header according to a first communications protocol into a data header according to a second communications protocol. Optionally, the data is encompassed in an SMS message. In some exemplary embodiments of the invention, the system further comprises a plurality of communications protocols from which the first communications protocol and the second communications protocol are selected. Optionally, the server translates any one of the plurality of communications protocols into any of the other plurality of communications protocols.

There is further provided in accordance with an exemplary embodiment of the invention, a method of translating data, comprising: sending data from a first user device to a second user device, wherein the first user device uses a first communication protocol different from a second communication protocol of the second user device; determining the second communication protocol of the second user device; and, translating the data from the first communication protocol to the determined second communication protocol of the second user device by exchanging a header in the first communication protocol and at least some content of the data with a header in the second communication protocol. Optionally, the first communication protocol is selected from an exemplary group comprising Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G. Optionally, the second communication protocol is selected from an exemplary group comprising Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G.

There is further provided in accordance with an exemplary embodiment of the invention, a method of providing at least one icon of an iconic language to users of a communications network system, comprising: identifying users of the communications network system; creating a group of users comprised of at least one user, but less than all users, of the communications network system; assigning at least one icon to the group; and, providing the at least one icon to the group of users.

There is further provided in accordance with an exemplary embodiment of the invention, a method of compiling statistics in an iconic language communication network system, comprising: transmitting at least one iconic language message; storing the at least one iconic language message on a database; analyzing the at least one iconic language message; and, compiling statistics based on the analyzing. Optionally, the analyzing comprises determining the context of at least one icon within the iconic language message. Optionally, the analyzing comprises determining the frequency of usage of at least one icon within the iconic language message.

There is further provided in accordance with an exemplary embodiment of the invention, a method of optimizing a message size in a communications network system, comprising: composing a message comprised of at least one message element; placing the at least one message element in an acceptable format in use by the communications network system; analyzing the at least one message element for the applicability of at least one more efficient format in use by the communications network system; and, substituting the at least one more efficient format for the acceptable format. Optionally, the acceptable format in use by the communications network system is icon-16 or text-16. Optionally, the at least one more efficient format is less than 16 bits but greater than 1 bit per character or icon.

There is further provided in accordance with an exemplary embodiment of the invention, a method for determining the operational status of a software application client installed on a user device, comprising: analyzing a log file to determine the most recent polling time of the user device; estimating the time differential between the most recent polling time and the current time; and, classifying the operational status of the software application based on the estimating. Optionally, the time differential is greater than a predefined amount the operational status is classified as closed. Optionally, the time differential is less than a predefined amount the operational status is classified as open.

There is further provided in accordance with an exemplary embodiment of the invention, a method for providing message delivery verification to a recipient, comprising: assigning an identification number to each message to the recipient received by a server; placing at the server each identification number for each message in a server message history of the recipient; transmitting a message to the recipient along with the server message history; and, comparing the server message history to a recipient message history stored locally by the recipient. In an embodiment of the invention, the method further comprises designating as missing messages, messages which are present in the server message history but which are not present in the recipient message history. In an embodiment of the invention, the method further comprises resending missing messages from server to recipient. In an embodiment of the invention, the method further comprises updating the recipient message history to include the identification numbers of the missing messages resent to the recipient. Optionally, the message is an electronic mail message. Optionally, the message is an instant message. Optionally, the message is an SMS message.

There is further provided in accordance with an exemplary embodiment of the invention, a method of communication, comprising: initiating the communication in a first protocol from a sender; and, continuing the communication in a second protocol. Optionally, the first protocol is selected from an exemplary group comprising Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G. Optionally, the second protocol is selected from an exemplary group comprising Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G.

There is further provided in accordance with an exemplary embodiment of the invention, a method of billing in a communication system, comprising: transmitting at least one message in a first protocol billed according to a first billing paradigm; and, transmitting at least one message in a second protocol billed according to a second billing paradigm. Optionally, the first protocol is selected from an exemplary group comprising Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G. Optionally, the second protocol is selected from an exemplary group comprising Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G. Optionally, the first billing paradigm is selected from a group consisting of MT-charge and MO-charge. Optionally, the second billing paradigm is selected from a group consisting of MT-charge and MO-charge.

There is further provided in accordance with an embodiment of the invention, a method of transferring data over HTTP using an originating SMS message, comprising: receiving an SMS message with an embedded URL at a user communication device; analyzing the SMS message for a field identifying the embedded URL; automatically opening an HTTP connection, using at least the user communication device, to a server hosting content associated with the URL; and, downloading the content over the HTTP connection to the user communication device for at least one of display or storage. Optionally, the content is at least one of an icon, text, audio or graphics.

There is further provided in accordance with an embodiment of the invention, a method for extending an iconic language, comprising: populating a content exchange location with content; communicating with a user device to the content exchange location; and, downloading at least one icon of the iconic language to a user device from the content exchange location to extend the iconic language. In an embodiment of the invention, the method further comprises uploading content to the content exchange location periodically. Optionally, communicating is conducted using at least one of Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G. Optionally, downloading is conducted using at least one of Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G or 4G. Optionally, content is at least one of text, audio, art, games, language icons, graphics or themes. Optionally, populating is performed by at least one of a user, a user group, a service provider or a third party. Optionally, extending the iconic language includes at least increasing, by at least one, the number of language icons stored locally by the user device.

BRIEF DESCRIPTION OF THE DRAWINGS

Exemplary non-limiting embodiments of the invention are described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EXEMPLARY EMBODIMENTS

Exemplary Communications Network System

In an exemplary embodiment of the invention, a schematic of a communications network system 100 (shown in FIG. 1) is provided which can optionally be integrated with existing communications networks. Optionally, communications network system 100 is a stand-alone system. In some exemplary embodiments of the invention, communications network system 100 is capable of performing a variety of tasks which enable more efficient, more convenient and/or more useful use of the communications networks. For example, in some exemplary embodiments of the invention, communications network system 100 translates (shown in FIG. 3) information from a sending, first user device in a first protocol and/or format into a second protocol and/or format in order for the information to be rendered usable by a receiving, second user device. In some exemplary embodiments of the invention, protocols include Bluetooth, Infrared, HTTP, TCP/IP, SMS, MMS, IMS, SIP, SIP-SIMPLE, WAP, WiFi, WiMax, Tispan, GSM, CDMA, iDEN, WCDMA, 3G, 3.5G and/or 4G. Optionally, more protocols are included, as described herein and/or as would be conceivable and/or applied in the future by those skilled in the art in view of the present disclosure.

Figure 1:
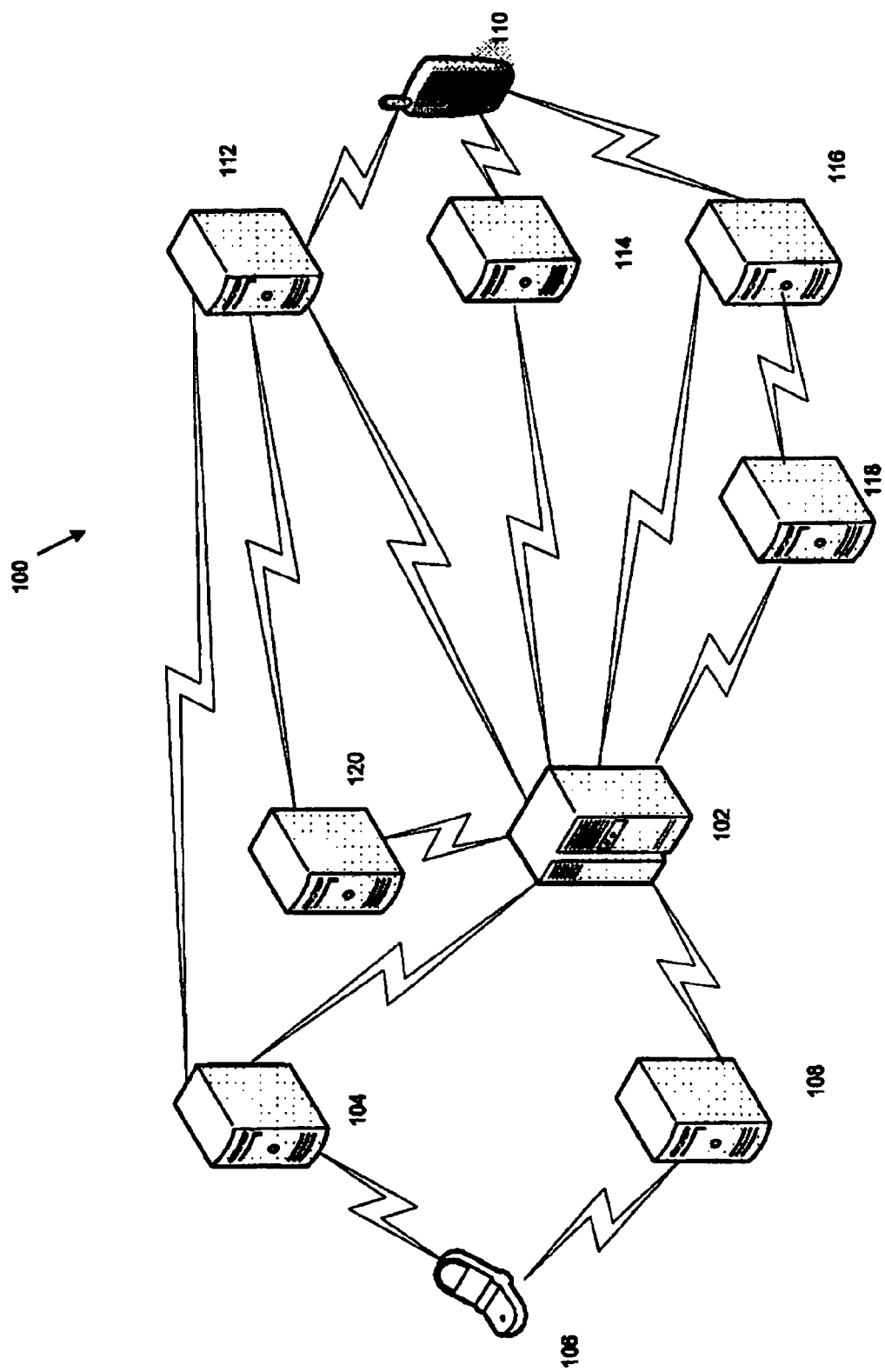
FIG. 1 is a schematic depicting components of a communications network system, in accordance with an exemplary embodiment of the invention.

Referring to FIG. 1, a schematic depicting components of communications network system 100 is shown, in accordance with an exemplary embodiment of the invention. In some exemplary embodiments of the invention, communications network system 100 is provided with at least one server 102. Server 102 is described in more detail with respect to FIG. 2, however, it should be understood that in some exemplary embodiments of the invention server 102 performs at least some tasks associated with making communications networks more efficient, more convenient and/or more useful. Server 102 is in operative communication to at least one service provider, in accordance with some exemplary embodiments of the invention. The at least one service provider is optionally any entity that provides communications and/or data transmission services to a user device 106. Optionally, a service provider is a Short Message Service Center ("SMSC") 104 for providing SMS content to user device 106. Optionally, a service provider is an Internet Protocol ("IP") gateway 108 for providing service to user device 106 via HTTP. User device 106 is optionally any device, such as a cellular telephone, personal data assistant and/or computer, which is capable of receipt and/or transmission of data over a communications network. For example, Orange® (France and Israel, GSM protocol) or Verizon® (US, CDMA protocol), the cellular telephone companies, are considered service providers. Comcast® (US), a provider of cable and internet services, is also considered an exemplary service provider. A plurality of servers 102 are provided to communications network system 100, in accordance with some embodiments of the invention. In an embodiment of the invention, an individual server is associated with a particular service provider. In addition, servers are optionally not classified by service providers 104, for example servers are classified by geography in some exemplary embodiments of the invention. Optionally, a plurality of servers is associated with a single service provider 104, 106.

Briefly, exemplary operation of communications network system 100 is described. A more detailed description is provided below, with respect to FIG. 8. In an exemplary embodiment of the invention, user device 106 is operative to send data to a second user device 110. In some exemplary embodiments of the invention, this is accomplished by user device 106 transmitting the data to at least one service provider 104, 108 associated with user device 106. At this stage, service provider 104 optionally sends the transmitted data to server 102 for server 102 to perform operations on the data to ensure its usability at second user device 110. For example, if a second service provider, with which second user device 110 is associated, uses a different communications protocol than first service provider 104, server 102 translates the data into a protocol compatible with the second service provider. Optionally, data transmitted from service provider 104 initially goes to a second service provider and to a second server (not shown) associated with the second service provider in order to perform operations on the data to make it useable by second user device 110. In an exemplary embodiment of the invention, the second service provider forwards useable data to second user device 110 for delivery. Optionally, server 102 does not perform any operations on the transmitted data and merely passes it along to the second service provider. In some embodiments of the invention, server 102 transmits the data to a broker 120, which acts as an intermediary between server 102 and the second service provider and/or second user device 110. Optionally, server 102 performs operations on the data in order to make it useable by broker 120. In some exemplary embodiments of the invention, the second service provider and/or server 102 stores raw and/or useable data for subsequent retrieval by the recipient. Optionally, a second service provider is a SMSC 112 for providing SMS content to second user device 110. Optionally, the second service provider is an IP gateway 114 for providing service to second user device 110 via HTTP. In some embodiments of the invention, broker 120 may also use an SMSC that is different than that of the service provider. In some embodiments of the invention, broker 120 may be located between user device 106 and server 102.

It should be noted that in some exemplary embodiments of the invention, first user device 106 and second user device 110 use the same service provider and/or are otherwise operationally compatible and thus, translation may not be necessary. In some exemplary embodiments of the invention, even though first user device 106 and second user device 110 use the same service provider a translation is needed, for example, if first user device 106 uses MIDP 2 and second user device 110 uses MIDP 1 (MIDP is explained below). However, server 102 may still perform operations, optionally on the data, including second user device technical capability detection, uploading and/or upgrading, user devices, data optimization, statistical analysis, billing, message archiving, data encoding, and the like. In some exemplary embodiments of the invention where multiple servers are used, the servers are operatively connected in order to allow communication between them directly.

In some exemplary embodiments of the invention, server functions are distributed amongst a plurality of servers. It should be noted that server 102, or a cluster of servers represented by server 102, may be central to serve all users in all locations, or may be placed in various geographical locations using a distributed architecture. In some exemplary embodiments of the invention using a distributed server, each geographical location server handles users communicating with other users in the same region. In some exemplary embodiments of the invention, communication with users outside of the geographical location is conducted by one geographical location server contacting another geographical location server. In an exemplary embodiment of the invention, users are assigned to different servers by using an identifier, for example the prefix of their telephone number.

In some embodiments of the invention, for example for an operator on a trial basis or a small operator, an additional server is used as a gateway and/or a communication link between the operator and server 102. Optionally, a device capable of receiving SMS and communicating them to a server as well as sending SMS received from a server (such as a SIM box) is used, which is controlled by server 102.

In an exemplary embodiment of the invention communication network 100 is used for transmitting data which is capable of transmission via SMS. This data may include, for example, an iconic language, may relate to gaming and/or entertainment, may be textual in nature or may be audio or music related. Combinations of data types may also be transmitted.

In an exemplary embodiment of the invention, communication over communications network system 100 originates from any of its component elements. For example, communication optionally originates from a user device, a service provider, a broker, and/or a server.

Exemplary Server

Figure 2:
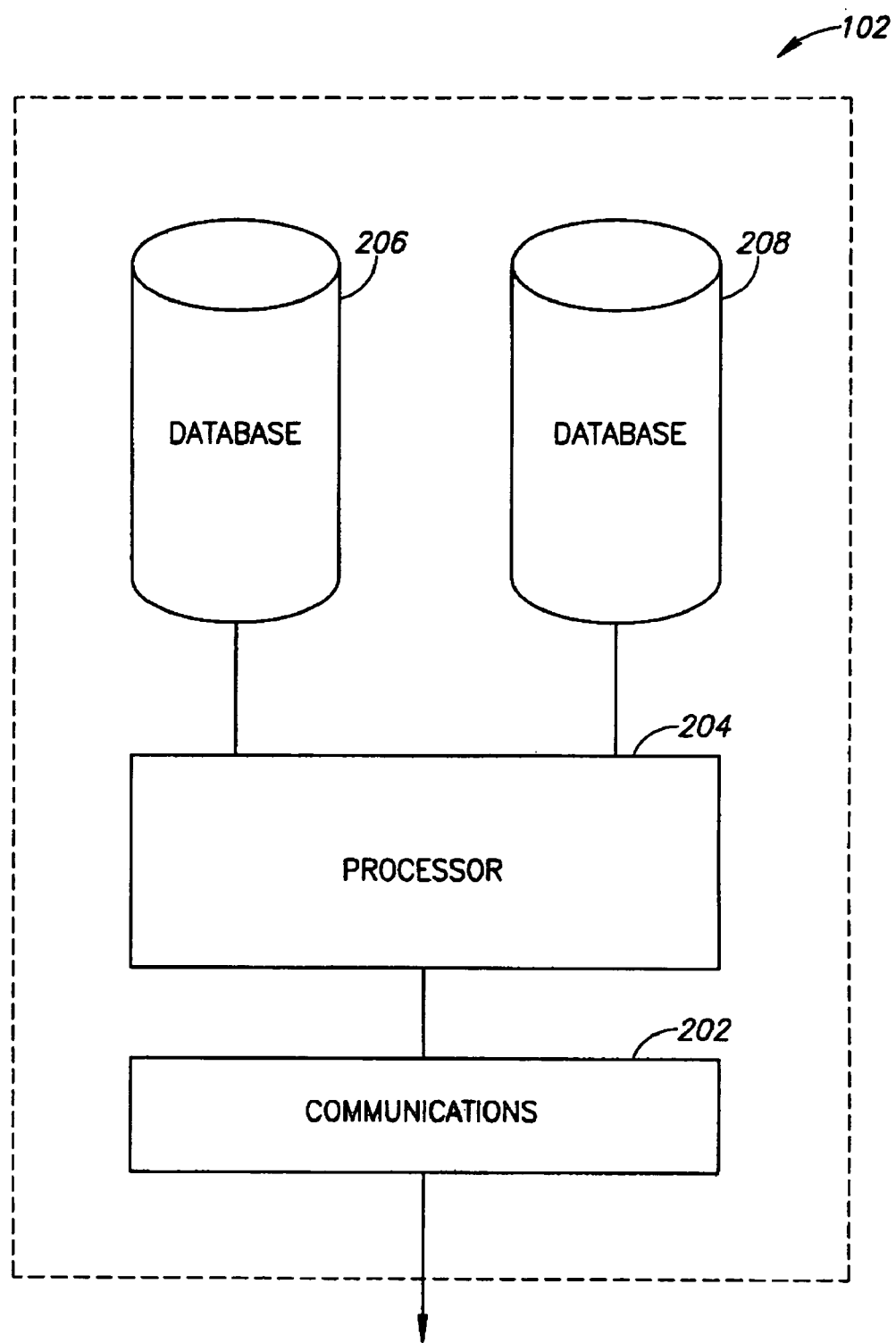
FIG. 2 is a block diagram depicting a server apparatus in a communications network system, in accordance with an exemplary embodiment of the invention.

Referring to FIG. 2, a block diagram is shown depicting exemplary functional architecture of server 102, in accordance with an exemplary embodiment of the invention. In some exemplary embodiments of the invention, server 102 is a computer provided with at least one data processor 204 and/or at least one database 206 for data storage. Server 102 is also generally provided with communications 202 functionality in order to enable communication with other elements of communications network system 100. Optionally, server 102 communicates with other servers, service providers, databases, management systems and/or user devices.

As described above, server 102 is generally provided with at least one database 206 for data storage. Server 102 is optionally provided with additional databases 208 for storage of additional data, such as icons of an iconic language, for example as described in U.S. Provisional Application Nos. 60/644,021, 60/807,855, 60/807,863, Israel Application No. IL 166322 and PCT application being filed in the International Bureau on same date, PCT/IB07/50143 entitled "Iconic Communication", the disclosures of which are herein incorporated by reference. In some exemplary embodiments of the invention, data comprises user information, messages sent and/or received in communications network system 100, and/or any information related to the operation of communications network system 100 and/or related devices, such as server and/or client software.

In some exemplary embodiments of the invention, server 102 contains a database for centralized storage and maintenance of data related to an iconic language. Data related to an iconic language optionally includes language categories, language icons, icon identification, graphical images, icon names, and the like. This database optionally contains different versions and customizations of the iconic language. Optionally, the database is hierarchical and/or relational. In some exemplary embodiments of the invention, the iconic language database contains language category symbols directly or indirectly associated with the language icons. Optionally, the iconic language database contains language sub-category symbols subordinated to the language category symbols and associated with the language icons. Alternatively, the iconic language database does not associate icons to categories. In some exemplary embodiments of the invention, each language icon has a unique identification number assigned to it. Optionally, this identification is stored in database 206. Data processor 204 is capable of processing and managing the data stored in the databases and related to the language icons (e.g. icon names, ID, user group, help files, different language versions for each, etc.).

In accordance with some exemplary embodiments of the invention, the iconic language database is partially or fully updated periodically and/or at preset times. Optionally, a partial update includes adding or removing categories of icons. Alternatively, a partial update includes adding or removing at least one icon, but not the whole category or subcategory to which the icon is assigned. In an exemplary embodiment of the invention, updates are initiated in response to a request from user device 106. Additionally or alternatively, updates are initiated in response to data transmitted from server 102 or a service provider.

In an exemplary embodiment of the invention, the iconic language database contains at least one special language category (hereinafter "system category") and at least one graphical image associated with this category (hereinafter "system icon"). The system icons contained in the system category are, for example, language icons, trademarks, logos, or other commercial graphical images. In some exemplary embodiments of the invention, these system icons are not available for a user while composing a message via a device, but are included in messages originated by server 102 and/or a third party server. Optionally, these system icons are received and read by a user.

The iconic language database, or a different database, optionally contains other non-iconic language icons such as those that are intended to indicate various control functions. Optionally, such icons may have a dual function, being used for both control and language. For example, a "send icon" could be considered a control function apart from its everyday linguistic usage, with the send icon being used to send data, and not actually convey the word "send". Another example of a control function icon could be a help icon, which is not necessarily intended to convey the word "help", but rather to call up a help text and/or application to instruct the user about something.

The above databases optionally contain multiple variations of the iconic language icons, system icons, control function icons and/or other icons. Exemplary variations include: icons in different sizes to be used for different display sizes; and/or textual elements in different fonts/sizes/colors to match different display sizes; and/or to match users' preferences; and/or icons relevant to different languages. Furthermore, in some exemplary embodiments of the invention, the language category symbols, language sub-category symbols and/or language icons have associated names explaining the icon (or symbol) to the user. The icon names are optionally stored separately from the icons, and as such, may be in different languages from device to device.

In some exemplary embodiments of the invention, the icon language database and server 102 are used to provide language icons to a user device. Optionally, providing language icons depends on the technical abilities of the user device, such as memory and/or storage space. However, if a user device has memory for storing more icons than are included in a typical package, additional icons are optionally uploaded to, or downloaded by, the user from server 102, or in some embodiments, a specially provided download server 118. For example, downloading in practice is accomplished using WAP Gateway 116 to access download server 118, whereupon additional icons are stored. In some embodiments of the invention, a plurality of download servers are used, for example one to provide software applications and/or another server to provide updates and/or graphics. In some exemplary embodiments of the invention, data is hot swapped between server 102 and the user device depending on the needs of the user device. In an exemplary embodiment of the invention, an automated mechanism is used in which an icon or a whole category of icons are fetched from the server. Such methods are optionally used to build virtual/dynamic databases on user devices, and additionally, user devices with very limited storage memory are used more effectively. These methods are optionally generalized to support a full range from ample storage memory on the user device to no storage memory at all and working over communications network system 100.

In some exemplary embodiments of the invention, a user information database is provided to server 102. Information optionally includes: user device information; personal data; subscription information (described below); group membership (described below); billing information, service provider; user's contact list; token, and other useful information about the user. In an exemplary embodiment of the invention, the user information database also contains data related to user groups, the groups being comprised of a plurality of individual users (members). Optionally, a user can be a member of more than one group simultaneously. In some exemplary embodiments of the invention, data related to user groups includes: group names; user membership in the groups; rules for joining the group; icons and/or icon categories associated with each group; and the like.

Server 102 optionally contains an interface that allows users to create a new group and/or control the group's member list. For example, users are optionally permitted to send invitations to others to join a group, approve and/or deny requests to join, remove members, have administrator privileges over the group, grant such privileges to others, and the like. A user group could be comprised of stock brokers, people who live in New York City or sports fans, as examples.

In certain embodiments of the invention the names of iconic language icons may be tailored for specific user groups and/or self-customized by the group. The user group optionally also has a dedicated set of iconic language icons available to the group members only, for example by subscription to the dedicated set of iconic language icons. These dedicated language icons may be contained in generally available language categories as well as in special categories dedicated to the user group by subscription only. Different user groups optionally have different sets of dedicated icons and therefore, are optionally subscribed to different sets of dedicated icons. In some exemplary embodiments of the invention, a user group optionally personalizes the look and/or meaning of iconic language icons, add and/or delete iconic language icons, categories and sub-categories in accordance with the group's internal needs and preferences. In some exemplary embodiments of the invention, only members of a particular group are authorized to download the dedicated language icons. When using special icons for a user group, server 102 optionally manages the assignment of them to the member users of the user group by using the user phone number and/or other identification means. In an exemplary embodiment of the invention, a user group has at least one member and optionally, does not have all users of communications network system 100.

It should be noted that in an exemplary embodiment of the invention, the size of transmitted data can be reduced by indexing user group names to a table, the table correlating more efficient names (in terms of transmitted data size) to each group. For example, the user information database indicates that a user belongs to groups "abcdef" and "abcdeg", and group "abcdef" is indexed as 1 while group "abcdeg" is indexed as 2 in the correlation table. In an exemplary embodiment of the invention, icons assigned to group "abcdef" are prefixed with the integer 1, instead of having to repeat the full name of the group before each icon assigned to it. In some exemplary embodiments of the invention, the correlation table also exists on user device 106. This saves significant message space in some exemplary embodiments of the invention. In an exemplary embodiment of the invention, server 102 supports different types of processes inside the group, for example interactive "democratic" or centralized decisions concerning new members, new icons, icon names, tailored graphical images of "common-use" icons, etc.

In an exemplary embodiment of the invention, server 102 is provided with a message database for storing some or all of the messages sent via server 102. Optionally, it analyzes the messages for various purposes, including gauging the frequency and/or context of icon use. Optionally, analysis is conducted on messages to determine how much and/or in what relation certain icons are used with other icons.

Exemplary Translation Process

Figure 3:
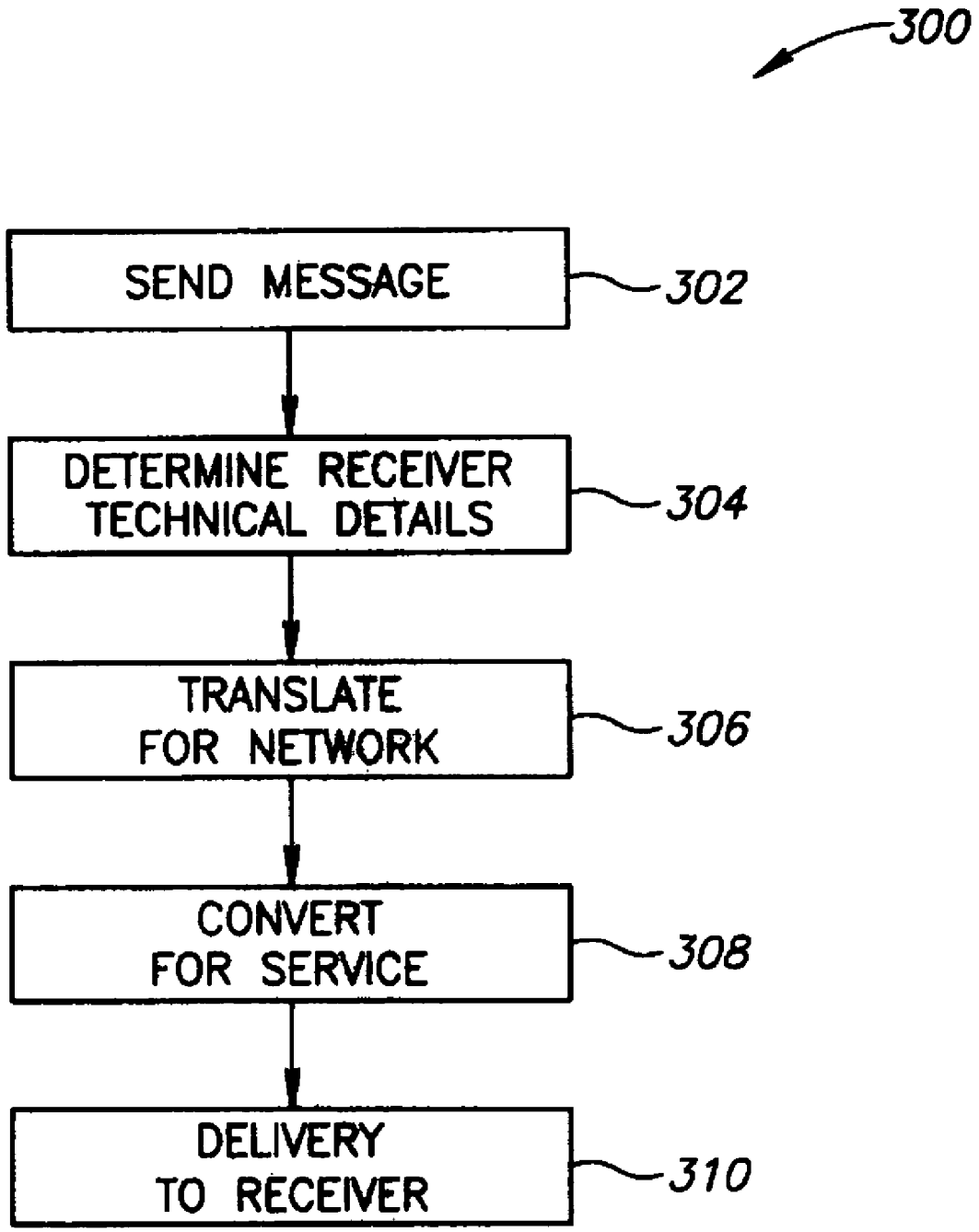
FIG. 3 is a flowchart depicting a translation process, in accordance with an exemplary embodiment of the invention.

Referring to FIG. 3, a process 300 for translation is depicted in accordance with an exemplary embodiment of the invention. Translation is optionally required if a user sends (302) data according to a first communications protocol, such as from one network and/or service format to a receiver who uses a different, second communications protocol. According to some embodiments of the invention, server 102 translates data to be compatible between cellular telephone networks, broadband networks, POTS networks, the Internet network, other data communication networks, and/or between different services (e.g. messaging services like SMS, MMS, instant messaging, IMS and others, mobile advertising, mobile-content service, etc.) based on a determination (304) of the receiver's technical details (e.g. network, service format, etc.). In an exemplary embodiment of the invention, server 102 optionally translates (306) between different types of networks, such as between a CDMA cellular telephone networks and GSM cellular telephone networks. In an exemplary embodiment of the invention, translation is facilitated by implementing the Java 2 Platform, Micro Edition ("J2ME") Wireless Toolkit supporting the Java Technology for the Wireless Industry specification (e.g. http://java.sun.com/products/j2mewtoolkit/) at a user device, such as first user device 106 and second user device 110. The J2ME Wireless Toolkit is a toolbox for developing wireless applications designed to run on cell phones, mainstream personal digital assistants, and other small mobile devices. The toolkit includes emulation environments, performance optimization and tuning features. In an exemplary embodiment of the invention, data in the form of a message body is the same, but a message header is different between the various networks. For example, a J2ME port number for a GSM J2ME network is optionally different than a Class ID in a CDMA BREW-based network.

The J2ME toolkit may also include a Wireless Messaging API (WMA) that provides platform-independent access to wireless communication resources like Short Message Service (SMS). In some exemplary embodiments of the invention, server 102 facilitates converting a received message into a message complying with a specific service transmission protocol. For example, for complying with the SMS service, server 102 converts (308) a message into the SMS payload. In an exemplary embodiment of the invention, the message transmission for SMS communication optionally has different implementations for client-client and client-server modes of operation.

In client-client mode the message contains a standard SMS header (e.g. as used in GSM, CDMA, etc.) including a destination phone number, and server 102 designated port number of a user device (typically different from the default or other "well known" port numbers; in CDMA BREW it may be called as "Class ID"), and data, which can be characterized as a message and/or as the SMS data payload. In some embodiments of the invention, the port number/Class ID are in the contents of the general SMS payload. For example, a GSM non-J2ME user device might show the port number as part of the SMS data content. Optionally, the message is in an iconic language. Optionally, the message is encoded, for example as described below.

In client-server mode, the message contains a standard SMS header (e.g. as used in GSM, CDMA, etc.) with a server address as an intermediate destination, while the SMS payload (data content) contains another message header (including final destination URI) attached by data transmission software to the message. Upon arrival at the intermediate destination, the server takes the final destination URI out of the SMS payload and puts it as the SMS destination, while optionally putting in the sender URI, extracted from the SMS arriving at the server, as part of the SMS payload, so the recipient client will be able to identify the sender.

Final Destination URI may be in various formats:

a. To another phone: tel://[phone number], e.g. tel://+972544550135;

b. To an email: email://[email address], e.g. email://abc@aol.com;

c. Direct to an IP: udp://[ip address]:[port], e.g. udp://127.0.0.1:8009;

d. To Instant Messaging user, etc.

In an exemplary embodiment of the invention, server 102, acting as an intermediate destination, recognizes the standard SMS headers, handles the rest of the message as payload and forwards it to the final destination device for delivery (310). Optionally, the header is analyzed by server 102 to determine where to deliver the message. Upon receiving the SMS-formatted message, the receiving user device extracts the SMS header and forwards the rest of the message to a message reading application for display to the receiving user. Optionally, the SMS-formatted message is decoded, encoding and decoding described below, prior to being displayed on the receiving device. Optionally, the displayed message is in an iconic language. In some exemplary embodiments of the invention, the server generates messages in a manner similar to the messages originated by a user device. This capability is optionally used for sending system-originated messages of different types, for example, for advertising, personalized content services, update alerts, etc.

Exemplary Methods for Transmitting Data to a User Device

In some exemplary embodiments of the invention, communications network system 100 uploads data, such as software and/or icons, to a device in order to make the device more useful and/or operable with communications network system 100. In some exemplary embodiments of the invention, communications network system 100 is capable of transmitting data to user devices 106, 110 in a "push" and/or "pull" mode of communication. Optionally, "push" and/or "pull" modes are selected based on a device's particular technological abilities. Optionally, what data is transmitted to a user device is selected based on the device's particular technological abilities and/or installed software status and/or business considerations when more than one option is supported; for example a service provider might prefer to use the MIDP 1 "pull" method for all user devices instead of the MIDP 2 "push" method, since the service provider might prefer the WAP/HTTP billing model over an SMS billing model (WAP/HTTP vs. SMS described in more detail below with respect to FIGS. 4 and 5). Table I, below, demonstrates how various modes of operation are carried out depending on the environment, according to an embodiment of the invention.

TABLE I

How various modes of operation are carried out depending on environment

| | Service Activation | Send Message | Receive Message |
|---|---|---|---|
| MIDP2 with WMA | Over SMS | Over SMS | Over SMS |
| BREW with BREW SMS Support | Over SMS | Over SMS | Over SMS |
| MIDP2 with WMA and SMS Alert | Over SMS | Over SMS | Over HTTP/ SMS Alert |
| MIDP1 with WMA | Over SMS | Over SMS | Over HTTP |
| MIDP2 without WMA | Over HTTP | Over HTTP | Over HTTP |
| MIDP1 without WMA | Over HTTP | Over HTTP | Over HTTP |
| BREW without BREW SMS Support | Over HTTP | Over HTTP | Over HTTP |

In an exemplary embodiment of the invention, software is pre-loaded on a user device prior to commencement of use by the user. In some exemplary embodiments of the invention, software is downloaded by and/or uploaded to the user device. Optionally, software is downloaded by and/or uploaded to the user device using over-the-air ("OTA") technologies. Optionally, software is downloaded by and/or uploaded to the user device using WAP Gateway 116 and dedicated download server 118, in combination.

GSM Mobile Information Device Profile ("MIDP") is the J2ME implementation for handheld user devices (a detailed description can be found at http://wwwjcp.org). Some of the currently available user devices support MIDP 1 version (specification JSR-37) while a newer generation of user devices supports MIDP 2 version (specifications JSR-118 and up). The principal difference between the versions, as far as some embodiments of the present invention are concerned, is that MIDP 2 allows a software application to register as a default handler of data, such as for SMS messages that are received on a specific port, whereas MIDP 1 does not allow that. Thus, on MIDP 2 devices it is possible to send messages in "push" mode, and have the device OS transfer them automatically to the proper software application for handling, whereas on MIDP 1 devices it is required that the proper software application work in "pull" mode in order to ensure that it handles the messages and not the default messaging software on the device. In an exemplary embodiment of the invention, transfer of a message to the proper software application for handling also includes automatically activating the software application so that it may perform operations on the message at the user device. It should be noted that future generations of MIDPs, JSRs or similar applications are likely to have this ability to associate a particular software application as the default handler of particular types of data and that the described methods and apparatuses herein apply to these newer devices and applications (e.g. MMS, IMS).

In an exemplary embodiment of the invention, various scenarios exist in a client-server operation mode for data transmission to a user device, depending on the user device level of support (i.e. MIDP 1, MIDP 2 and WMA for the GSM J2ME, and BREW for CDMA). In an exemplary embodiment of the invention, WMA enables the sender user device to issue an SMS from a software application. In an exemplary embodiment of the invention, MIDP 2 enables a recipient user to open the message automatically using the appropriate software application. For example, if the sender transmits a message to the receiver which is in an iconic language, upon receipt, a receiver with MIDP 2 will automatically have the iconic language message opened by a software application designed to display the message. In an exemplary embodiment of the invention, most BREW user devices are capable of automatically opening an iconic language message (e.g. "ZMS") with the appropriate software, however not all BREW user devices can and MIDP 1 user devices cannot. The various scenarios using these environments are discussed in more detail below and are loosely subdivided into the classifications of service activation, sending and receiving.

In some embodiments which use MIDP2 with WMA support or BREW with SMS support, activation is accomplished using SMS messaging. In an embodiment of the invention, a user activating service with communications network system 100 chooses a nickname, by which the user will be known to other users of system 100. After the user enters his nickname, the software client on the user's communication device 106 optionally adds an initial random security token. In an embodiment of the invention, an activation SMS is sent by user device 106 to server 102 (sending described below). In some embodiments of the invention, the user is prompted not to close the software client at user device 106 and to wait for a registration confirmation message. Optionally, the user does not have to wait for the registration confirmation message, and the message is added to the user's inbox and is retrieved later (as described below). Server 102 extracts the user's phone number from the SMS activation message header, and creates a reply message that contains an updated security token and the user's phone number, in some embodiments of the invention. Optionally, the reply message is sent as a ZMS message over SMS. In a situation where the user is blocked from the service and/or service provided, the user will optionally get a notification that activation was not successful and/or was not authorized. Otherwise, server 102 registers the updated security token and user phone number, and in some embodiments of the invention uses them for verification of future incoming data/messages from the user device 106. In an embodiment of the invention, when a valid updated security token is received, user device 106 stores the updated security token and phone number and informs the user that registration/activation was successful.

In an embodiment of the invention, sending messages and/or data in a MIDP2 with WMA support or BREW with SMS support environment is achieved by using the SMS protocol, as would be known by those skilled in the art.

Figure 4:
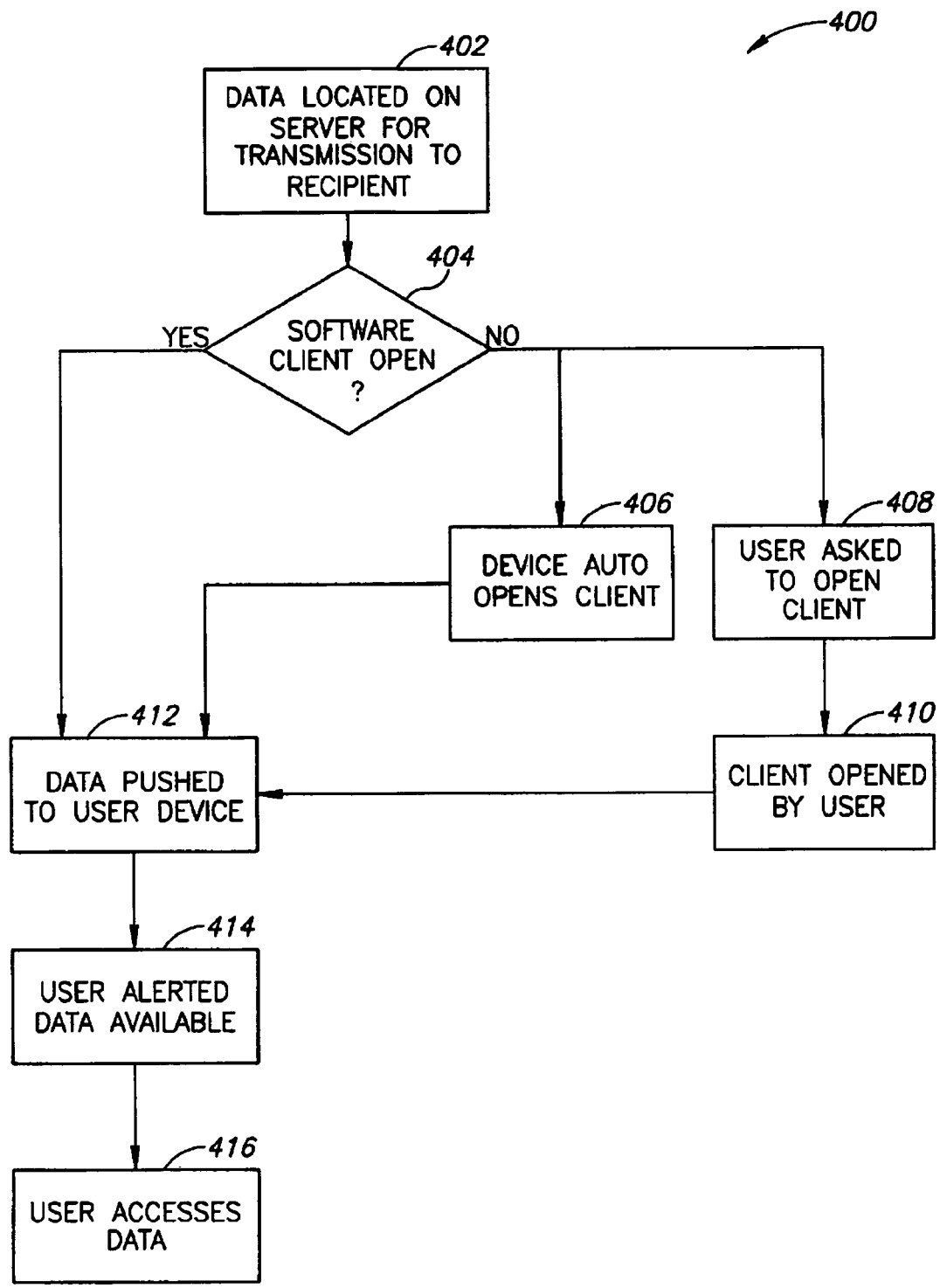
FIG. 4 is a flowchart depicting a data transmission method for MIDP 2 and some BREW protocols, in accordance with an exemplary embodiment of the invention.

Receiving messages and/or data in a MIDP2 with WMA support environment is also optionally accomplished using known SMS procedures. FIG. 4 shows a flowchart 400 depicting a method of transmitting data to a MIDP 2/BREW (capable of SMS client activation) device, according to an exemplary embodiment of the invention. In this embodiment, data is located (402) on server 102 and is made available for transmission to the recipient's device. Server 102 determines (404) the operational status of the software client at user device 110, that is if the recipient device's software client is likely open or closed. In some exemplary embodiments of the invention, the software application client sends a signal to server 102 that the client is opening or closing. Optionally, this signal is stored in a database and indexed to the user device which has sent the signal. If it is determined (404) that the software client is likely closed, either the user device 110 automatically (406) opens the software client or the recipient is asked (408) by the user device 110 to open the software application client for displaying the message, in accordance with an exemplary embodiment of the invention. Once the software client is automatically (406) opened or the recipient opens (410) the client, or if the software client was open to begin with, the data located (402) on server 102 is pushed (412) to user's device 110. In an exemplary embodiment of the invention, the software client alerts (414) the recipient that the data is ready to be accessed (416).

Operation in MIDP1 with WMA and MIDP2 with WMA and SMS Alert environments differs slightly from the above described operation in that HTTP is used for receiving, in some embodiments of the invention. Each environment is discussed separately below.

While service activation and message/data sending is substantially the same as with the MIDP2 with WMA environment, receiving messages/data in the MIDP1 with WMA environment is modified, partly due to the lack of this environment's ability to properly associate an incoming message with the appropriate software application. By using the methodology for receiving message herein, in a "pull" fashion, incoming messages and data can be viewed and/or manipulated using an appropriate software application. In an embodiment of the invention, polling requests via HTTP are used in order to determine if there are messages and/or data waiting for a user at server 102. An exemplary request is constructed in the form: http://server:port/ZlangoWeb/ReceiveZMS?info=<ZMSmessage>. Answers to this request can range from "no message" to an indication of the number of messages that are waiting to an error message, for example that the user is not registered or has not completed registration/activation or there was a technical problem with the request, as examples. In an embodiment of the invention, server 102 stores each message it receives and assigns it a unique ID. Server 102 will remove any retrieved message from the list of waiting messages, in accordance with some embodiments of the invention.

Figure 5:
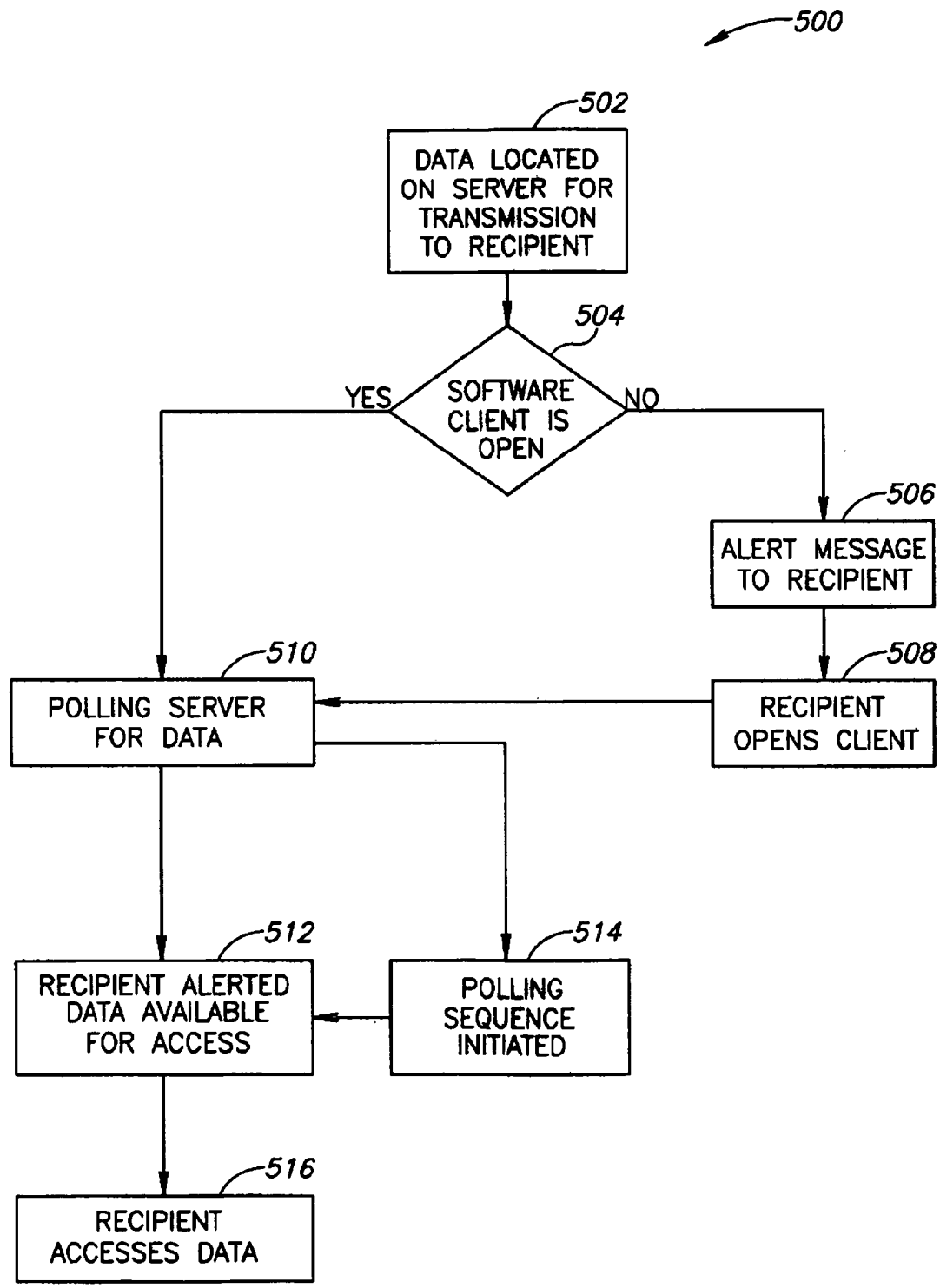
FIG. 5 is a flowchart depicting a data transmission method for MIDP 1 and some BREW protocols, in accordance with an exemplary embodiment of the invention.

FIG. 5 shows a flowchart 500 depicting a method for transmitting data to a recipient using MIDP 1 with WMA support, in accordance with an exemplary embodiment of the invention. Once data is located (502) on server 102 for transmission to a recipient, sending data in a MIDP 1 with WMA support environment is conducted optionally using HTTP and/or TCP/IP and/or WAP formats. Receipt of messages in this operational environment uses a combination of SMS alerts and HTTP/WAP and/or TCP/IP polling requests, in accordance with an exemplary embodiment of the invention.

In an exemplary embodiment of the invention, it is determined (504) if the software client is open at the recipient's device.

In situations where the software client is closed or there is no other information on its status, server 102 generates (506) an alerting SMS. Ideally, the user opens (508) the software client at user device 110, in an embodiment of the invention. Optionally, a software application client is considered to be closed if the user device hasn't polled the server for at least a predefined period of time. Optionally, the predefined period of time is up to 5 minutes. Optionally, the predefined period of time is greater than 5 minutes. Optionally, the predefined period of time varies, depending on various considerations, such as server loading and/or customer service.

In an embodiment of the invention, a software application client is considered to be open if the user device is actively polling a server, polling being described below. Optionally, a software application client is considered to be open if the user device polled a server within a predefined period of time. When it is known that the software client is open, whether as a consequence of the alerting SMS or as a result of user-initiative, the client optionally performs actions including initiating a polling sequence.

In an embodiment of the invention, the client commences polling (510) and retrieving the SMS messages (by a 'Get' command) that are stored and waiting at server 102. This also informs server 102 that the software client is open. Server 102 optionally verifies the client identity by using the unique identification token.

Subsequent to the initial retrieval of messages, an optional progressive polling sequence is initiated (514) with the polls gradually increasing in time interval from each other until the polling sequence stops. In an embodiment of the invention, optional and/or interchangeable polling types are used (identified by TLV-53<Polling Type>, described below) which establish different polling behavior for the device. For example, a first polling type starts with a first polling which is 30 seconds after retrieving the messages stored on the server, a second polling is 30 seconds after the $1^{st}$ polling, a third polling is 1 minute later (i.e. 2 minutes from start), a $4^{th}$ polling is 2 minutes later (i.e. 4 minutes from start) and a $5^{th}$ polling occurs 4 minutes after the $4^{th}$ polling (8 minutes from start). A second exemplary polling type uses constant polling intervals, for example once every minute. Optionally, less than the 5 polls of the first type are used. By using less time in the polling intervals in an embodiment of the invention, message delivery can generally be expedited. In addition, using less polls will likely result in less traffic over the system and/or increased battery life of the communications device. It should be understood that these polling types, time intervals and number of polls are by way of example only.

In an embodiment of the invention, the exemplary polling sequence is initiated with the understanding that when a user is active there is likely to be a cluster of communication activity which may taper off as the sender and receiver lose interest in the "conversation" and/or the purpose for the "conversation" is satisfied. In an exemplary embodiment of the invention, a log is created on a database indicating at least the time of each polling. In an exemplary embodiment of the invention, this log is used to determine the operational status of the software application client, whether it is open or closed. For example, any indication in the log of no communication with the client since the last polling, or greater than a predefined period of time, is optionally considered as the client being closed.

In an exemplary embodiment of the invention, the recipient is alerted (512) that data is available for accessing (516) after polling (510), (514). In an exemplary embodiment of the invention, polling for waiting SMS messages occurs in response to a user sending a message. Optionally, the polling sequence described above commences in response to a user sending a message or, in some exemplary embodiments of the invention, if the client is "awakened" after a period of inactivity. In some embodiments of the invention, server 102 is implemented with a queue for messages that haven't generated an alert SMS yet and are waiting for the next polling to occur. Optionally, this implementation is used to save on database queries. In some embodiments of the invention, the security token and corresponding phone number are verified any time server 102 is accessed.

In some exemplary embodiments of the invention, server 102 records the time of any polling made by the client. Server 102 optionally checks the time that has elapsed from the last polling every time the server receives an SMS message for the user. If the elapsed time is greater than a predefined interval then the server optionally generates an alert SMS to send to the user. In some exemplary embodiments of the invention, the server analyzes the messages waiting for the user and generates an alert for messages which have not been retrieved by the user and have been waiting for longer than a predetermined period of time. Optionally, the server makes a notation that an alert was generated for the waiting SMS message. It should be noted that in some exemplary embodiments of the invention, the server stores messages and assigns a unique identification number to each one. Optionally, a retrieved message is deleted from the user's inbox and/or the server. Optionally, stored messages are analyzed for statistics gathering. In order to save database queries, in some exemplary embodiments of the invention, the server uses a dedicated queue for the SMS messages that are waiting for the next scan and have not generated an alert SMS yet.

In an MIDP2 with WMA and SMS Alert environment, receiving operation is conducted differently in order to provide the SMS alert in combination with delivery of messages/data by another protocol, for example HTTP. While much of receiving in this environment is similar to the MIDP1 with WMA support environment, it should be noted that no polling is performed in the MIDP2 with WMA and SMS Alert environment, in some embodiments of the invention. An alerting SMS message is transmitted from server 102 to user device 110 when a new message is received for the recipient, in an embodiment of the invention. In the event the software client is closed on user device 110, the user is asked to open the client or the client is opened automatically. Upon the launching of the software client, the client retrieves any new messages from server 102 using a non-SMS protocol. Optionally, the non-SMS protocol is HTTP. In the even the software client is open on user device 110, the received SMS alert initiates a retrieval of any new messages at server 102 by the software client, in an embodiment of the invention.

In some embodiments of the invention, the alerting SMS message is a ZMS message, containing iconic language content. In operation, such a message might not only be sent as an SMS alerting message but might also appear in the queue of new messages for the recipient. To avoid duplication of messages, a check-sum of an alerting SMS message is compared with the messages retrieved from server 102 and if a message is retrieved with a check-sum matching to a previously received alerting SMS message, this duplicate message is not provided to the user. Optionally, the duplicate message is deleted.

Referring to Table I, it can be seen that some environments do not primarily rely on SMS, or do not at all rely on SMS, for service activation, sending or receiving messages. The MIDP1 and MIDP2 without WMA and BREW without SMS support environments fall into this category, in accordance with some embodiments of the invention. Activation/registration is initiated in these three environments, in an embodiment of the invention, when a prospective user enters a nickname and the user's phone number into a software client located on user device 106. Optionally, the software client generates a security token and appends it to the user inputted data prior to commencing an activation session with server 102. In an embodiment of the invention, the initial message is transmitted to server 102 using a sending paradigm, as described below. The user is prompted to close the software client or the software client closes automatically and waits for an activation message from server 102. Assuming the user is authorized to activate service, the activation message is optionally an SMS message which contains a WAP link. In an embodiment of the invention, the user triggers the WAP link which serves to authenticate the user. In an embodiment of the invention, activation is concluded by the user closing the closing the activation message and restarting the software client. In the event the user was not authorized to activate service, the SMS indicates a failure and the activation session is terminated.

In an embodiment of the invention, server 102 creates a registration reply message that the software client retrieves upon the restarting of the software client, as described above. This registration reply message is retrieved using the standard receiving procedure described with respect to the MIDP1 with WMA environment. In some embodiments of the invention, the registration reply message includes an updated security token which is created by the server. The updated security token is stored at user device 106 and is correlated to the user's phone number. In the event that the updated security token is missing or is not valid for any reason, the activation/registration process fails.

Sending messages is conducted using non-SMS protocols, for example by using WAP Gateway 116 and/or IP gateway 108, in some embodiments of the invention. Optionally, the updated security token is used for verification of the sender by server 102. A query to server 102 regarding the status of the sent message is sent by user device 106, in an embodiment of the invention. The query is optionally constructed: http://server:port/ZlangoWeb/SendZMS?info=<ZMSmessage>&sender=<MSISDN>. In an embodiment of the invention, answers to the query are: a) "true" for successful sending of the message; b) "false" for a failure to send the message; and c) "error" for some technical error and/or if the status of the sending is unknown. Receipt of messages is achieved in a manner similar to that described with respect to the MIDP1 with WMA environment, in accordance with an exemplary embodiment of the invention.

In an embodiment of the invention, system 100 is used to implement an internet-like chat or messaging session between user devices 106, 110. For example, the session is initiated by user device 106 sending a SMS to user device 110 (e.g. through the server 102 and other relevant components). In some embodiments of the invention, server 102 tracks user device 106, 110 status and "knows" if the software client is on or off. Optionally, server 102 provides this status information to a user device which requests it. Optionally, the SMS activates a software client on user device 110 for carrying the session. In some embodiments of the invention, after the initiating SMS further communication between user devices 106, 110 is conducted using HTTP, for example in order to save on cost. It should be understood that user devices are not limited to cellular telephones, as indicated above. For example, personal computers are user devices 106, 110 in some embodiments of the invention.

In some embodiments of the invention, an adaptive mixed operation mode is used which permits communication between user devices 106, 110 without using an intermediate application server (i.e. a direct connection using servers only for transmission of messages) or alternatively uses an intermediate application server if at least one of the devices is determined to be incapable of communicating using a direct connection, for example requiring aspects of application processing on the intermediate server. According to the state of the art, a direct communication is not always possible, since a client usually (unless both are having an IP client like SIP) can't see the other client, and one is uploading to the server while the second polls the server, etc. An exemplary use for an intermediate server is to replace the J2ME port number with the BREW class ID as described elsewhere in this patent. Another exemplary use for an intermediate application server is handling delivery verification (such as described elsewhere herein). Yet another exemplary use for an intermediate application server is creating a second format image of a first format message for those that do not have a client capable of displaying the first format.

In some embodiments of the invention, a database is maintained, for example at server 102, which indicates a communication device's ability to operate using a direct connection. Optionally, ability is determined by the functionality of the software client installed on the device. Additionally or alternatively, ability is determined by the capabilities of the hardware of the device.

In some embodiments of the invention, information regarding a particular device's ability to communicate directly is stored and/or displayed in a contact list. Optionally, the contact list is stored on the server. Additionally, alternatively or optionally, the contact list is stored and/or displayed locally on a user device. In some embodiments of the invention, loss of a user's locally stored contact list is restored by using a backed-up version from the server. In some embodiments of the invention, changes in capabilities (for example the ability to directly connect) or other information relating the user's device are transmitted by the server to at least some members of the user's contact list automatically.

Information on the database and/or in a contact list is updated, in an embodiment of the invention, by a user device when at least one of: new software is installed or hardware upgrades permit the device to operate with a direct connection to other devices. In an embodiment of the invention, information regarding a device's ability to operate in a direct connect mode is transmitted to server 102 when a message is sent from the device. Optionally, the message is a ZMS message. In an embodiment of the invention, the transmitting device's operational ability is updated in the database upon receipt by the server of new information.

In an embodiment of the invention, when a direct connection capable device initiates communication with a device which is not capable of sustaining a direct connection, a server is used as an intermediary between the devices. The user of the device which is not capable of operating a direct connection is optionally invited via a message, for example SMS or ZMS, to upgrade his/her device to enable direct connections between user devices. Optionally, the reverse is possible. Exemplary methods and apparatuses for upgrading are described in PCT application being filed in the International Bureau on same date, PCT/IB07/05141 entitled "Activating an Application".

Message Format and Optimization

In an exemplary embodiment of the invention, the format of various types of messages is described below. Note that the first content field of all ZMS messages is an exception to the TLV rule (described below), it is the Protocol Version and its length is six bits, in an exemplary embodiment of the invention. Optionally, if its value is 0, it is considered to be an escape character, meaning that the next 12 bits will be taken as the Protocol Version, if the protocol ever needs to go beyond 63 versions. In an exemplary embodiment of the invention, the Protocol Version is encoded as a single character in URL-safe Base 64 (or in case of the use of escape, a zero followed by two URL-safe Base 64 characters).

In an exemplary embodiment of the invention, iconic language SMS messages are encoded using a TLV format—Type, Length, and Value. This optionally allows new information to be added to iconic language SMS messages by adding new types (the "T" in TLV). The type field is optionally 8 bits long, allowing for 255 types plus an "escape" type if 255 proves to be too few. The length field optionally allows an older client to skip over the value field of a new, unknown type, in accordance with some exemplary embodiments of the invention. The length field is optionally 10 bits long, allowing for a length of up to 1K for a single chunk. The length field will optionally specify a size in bits to allow for a given type to define its own implicit chunking size, allowing for best use of available space. For example, icons could be encoded using an Icon-9 type, which would mean that 9 bits would be used for each icon id, allowing for icon values up to 512, or Icon-12 which would use 12 bits per icon id and allow for icon values up to 4095.

In an exemplary embodiment of the invention, iconic language SMS content is a sequence of TLV's taken from three categories: <Icon-#>, <Text-#>, and <Extended-Icon-#>, where # is one of the available values for the particular type, as listed below (for example, Icon-7, Text-16).

A Text TLV <Text-#> contains a sequence of Unicode characters, in accordance with some exemplary embodiments of the invention. The particular # chosen will determine how many bits are used for each Unicode character id. For example, Text-16 allocates 16 bits per Unicode character, thereby covering the whole range of Unicode characters. Optionally, Text-7 or Text-12 are used with the invention to allow messages which use a more limited part of the full Unicode spectrum (for example, English uses the lower 7 bits of Unicode). Optionally, 2 to 16 bits are used per character. Optionally, more than 16 bits are used per character.

An Icon TLV <Icon-#> contains a sequence of icon identifications, in some exemplary embodiments of the invention. The particular # will determine how many bits are used for each icon identification. In some exemplary embodiments of the invention, Icon-9 is used which allocates 9 bits (512 possibilities) for each icon identification. Optionally, Icon-16 or more is used, to allow for a larger range of icon identifications. Optionally, 2 to 16 bits are used to identify an icon.

In order to support multiple icon sets, there is an Icon Set ID in accordance with some exemplary embodiments of the invention. In an exemplary embodiment of the invention, this is a sixteen bit integer value, allowing a very wide range of add-on icon sets. In any given icon set, the identification of the icons will start from 1. In order to include these icons in a regular SMS, the Icon Set ID is optionally specified in combination with the icon ID. In an exemplary embodiment of the invention, a user has only a few add-on icon sets and therefore an Icon Set Table TLV and an Extended Icon TLV are used.

The Icon Set Table TLV <Icon Set Table> contains a list of up to 16 Icon Set ID's, in some exemplary embodiments of the invention. These are the add-on Icon Set ID's which are used in a message. If there are none, no Icon Set Table TLV need appear in the message. If there are fewer than 16, the TLV can be correspondingly shorter.

In an exemplary embodiment of the invention, an Extended Icon TLV <Extended-Icon-#> is like an Icon TLV, but it contains an additional 4-bit field at the beginning which is an index into the Icon Set Table, specifying which Icon Set ID is applicable to the sequence of Icon ID's contained in the TLV.

A practical result of this scheme is that a message which contains, for example, 10 icons from 10 different add-on icons sets, will have 10 Extended Icon TLV's. A message which contains, for example 10 icons from the default icon set followed by 10 icons from a single add-on set, will contain 2 TLV's—an Icon TLV with the first 10 icon ids, followed by an Extended Icon TLV with the index in the Icon Set Table of the add-on set id and then the 10 remaining icon ids.

In some exemplary embodiments of the invention, mixed content TLV is used for optimal encoding of messages which contain both icons and text. The mixed content TLV optionally has a header which indicates the bit-width used for icon encoding and text encoding. Those numbers are fixed for the duration of that mixed content TLV, in some exemplary embodiments of the invention. Afterwards, there are alternating segments of icons ids and text, each optionally preceded by an eight bit length field.

Type fields which are optionally used are listed below. In an exemplary embodiment of the invention, the number in the list is the number used to represent the type in the encoding. The encoding scheme for the contents of a field is determined by the type, in accordance with an exemplary embodiment of the invention. Optionally, the contents of a field are encoded in Unicode 7—meaning that the contents are in chunks of 7 bits, each of which is to be interpreted as an unsigned integer representing a Unicode value. When we use the term Unicode-7, it refers to a data format only, with no specific semantics. Text-7 is a data type in the protocol which refers to textual content of an SMS message, encoded using the Unicode-7 data format.

Exemplary type fields which are used in accordance with some exemplary embodiments of the invention, include:
1. <Registration Identifier>
2. <Security Token>, optionally 18 bits
3. <Device Type>
4. <Sender Phone Number>
5. <Operator>
6. <Client Version Number>—provided as part of installation
7. <Language>—provided as part of installation or language update
8. <Sender Nickname>—contents optionally encoded in Unicode 7. Optionally, Unicode 16 is used. In some embodiments of the invention, one of the Header TLV's defined below is used.
9. <Destination Phone Number>
10.-19. <Icon-#># can be any number from 7 through 16, which correspond to 10-19. This encodes a series of icon identifications, where each icon identification is represented by # bits.
20.-29. <Text-#># can be any number from 7 through 16, which corresponds to 20-29. This encodes a series of Unicode characters, where each character is represented by # bits. In an embodiment of the invention, the text inserted into the message is in "logical" order, like UTF-8, and not in "visual" order.
30.-39. <Extended-Icon-#> like <Icon-#>, but with an additional 4 bit field before the series of icon identifications. The 4 bit field represents an index into an Icon Set Table.
40. <Icon-Set-Table> is a series of 16 bit icon set identifications. There can be up to 16 such identifications. In an exemplary embodiment of the invention, one <Icon-Set-Table> TLV appears in a message. Optionally, multiple such TLV's appear, allowing for more than 16 add-on icon sets. In such a scenario, a reference to an Icon Set Table is optionally to the most recent prior Icon Set Table in the message.
41. <Content Check> contains a 16 bit value giving the length in bits of the message up to the point where the Content Check appears. In an exemplary embodiment of the invention, it is placed at the end of the message, to allow verifying that the complete contents of the message were received.
42. <Mixed Content> is a special format for encoding most messages which contain both text and icons. Its goal, in an exemplary embodiment of the invention, is to reduce to a minimum the overhead involved in switching back and forth between text and icons inside a message. Optionally, it starts with two 4 bit fields, the first of which gives the number of bits used per icon, and the second of which gives the number of bits used per character of text. After that, it has an optionally alternating sequence of an icon chunk and a text chunk, as many times as is necessary until the whole message is encoded. Each chunk optionally starts with an 8 bit field indicating the number of items (either icons or characters) in the chunk. (Thus this TLV cannot be used for messages which contain text strings longer than 255 characters.) In an exemplary embodiment of the invention, the data subsequently appears, with each item taking the number of bits indicated in the header of the TLV. It should be noted that if a messages starts with a text string, the Mixed Content TLV will still optionally start with an icon chunk. The length of that chunk will optionally be 0. Likewise, if a message has a series of icons longer than 255, say 265, the Mixed Content TLV will encode this as an icon chunk of length 255, a zero length text chunk, and another icon chunk of length 10, in accordance with some exemplary embodiments of the invention. In an embodiment of the invention, the text inserted into the message is in "logical" order, like UTF-8, and not in "visual" order.

To summarize an exemplary internal structure of <Mixed Content>:
<icon id width><text char-width>(<icon-chunk><text-chunk>)*
where:
<icon-chunk><numIcons><icon-id-1><icon-id-2> . . .
<text-chunk>=<strLength><char-1><char-2> . . .
It is noted that in some exemplary embodiments of the invention numIcons and/or strLength are 0.
43. <Simple Header> contains 18 bits of security token, 2 bits for phone number prefix type, and 50 bits which includes the destination phone number, in accordance with an exemplary embodiment of the invention. It should be noted that the bit sizes are by way of example only, and any bit size is optionally used which enables proper transmission of the message to which the header is attached. In some embodiments of the invention, when this header is used for an outgoing message, this phone number is the destination phone number. If this header is optionally used for an incoming message, this phone number is the sender phone number. In some exemplary embodiments of the invention, a separation is used between the prefix encoding and the number encoding. This is because in some embodiments of the invention, encoding the full destination phone number means that any non-numerical prefix cannot be encoded and/or because any information about leading zeroes will be lost. In an exemplary embodiment of the invention, the valid prefix types are: (0=NO_PREFIX, 1=PLUS_PREFIX, 2=SINGLE_ZERO_PREFIX, 3=DOUBLE_ZERO_PREFIX).
44. <Header with Nickname> is like <Simple Header> in some exemplary embodiments of the invention, but adds the Nickname encoded using Text-12. Note that in some embodiments of the invention, the length of the nickname can be derived from the length of the full TLV minus the first two fixed fields. In some English language implementations of the invention, the nickname is encoded using Text 7.
45. <Header with Nickname and Sender Phone> is like <Header with Nickname> in some exemplary embodiments of the invention, but optionally adds an additional 2 bit phone prefix and 50 bit phone number for the sender phone. This header is optionally used for outgoing messages over HTTP, which utilizes both phone numbers. In an embodiment of the invention, the destination phone number comes first, followed by the sender phone number, followed by the variable length nickname.
46. <Registration Reply>—marks a message as a reply from the server to a registration message. Its length is 4 bits, in accordance with an exemplary embodiment of the invention, indicating the following values:
"0"=Success
"1"=Failure
"2"=Unauthorized user
In an embodiment of the invention, the Security Token will be sent only in case of "Success" (0).

47. <Send Notification Header> is like <Header with Nickname and Sender Phone>, in accordance with an embodiment of the invention. The destination phone number is the sender phone number, and comes first, followed by the original sender phone number, followed by the variable length nickname of the original sender. In response to a ZMS, following this TLV, server 102 sends a notification SMS to the sender client informing him that a new ZMS from the original sender (phone number and nickname) is waiting. In an embodiment of the invention, this is used for BREW devices, that might suspend the operation on the client after 3 seconds in the case that the ZMS has activated it but there was no response from the user. In such an embodiment, the client sends this TLV in order to command server 102 to issue the notification SMS to let the user know that there is a new message waiting.

48. <Message Type>—marks the type of ZMS message. Its length is 4 bits, in some embodiments of the invention, indicating the following values:
"1"=Registration Request
"2"=Registration Reply
"3"=Incoming ZMS
"4"=Outgoing ZMS
"5"=Send Notification Header
"6"=Notification ZMS
"7"=Notification ZMS and ZMS content
"8"=Client Service Message
   A Client Service Message <8> type confirms to server 102 of the client status, such as the received messages history and more, in some embodiments of the invention.

49. <ZMS Message ID> contains a 16-bit value in some embodiments of the invention. Optionally, this field uses a value containing more or less bits (e.g. 12-bit), depending on the number of IDs that are likely to be generated within a set period of time. For example, networks with prolific communicators may need more bits for IDs. This TLV optionally marks the message with its own ID. In an embodiment of the invention, this ID is consecutively increased per message, separately counted per each user, and put by server 102 in each ZMS message, allowing a user client to identify if a message has been missed. In an embodiment of the invention, IDs assigned to a message are cyclic with the IDs restarting after exhausting every ID possibility in the defined set of values. In an embodiment where the IDs recycle, the software of the user device is adapted to recognize that a preceding ID in the list of IDs can actually be a later message.

50. <ZMS Delivery History> contains a 48-bit value, in some embodiments of the invention. This TLV field is used to help correlate at the server what is the maximum ID (ZMS with maximum ID) received by user and the history of ZMS messages sent to the user. In an embodiment of the invention, this correlation allows the server to identify if a message has been missed. In some embodiments of the invention, delivery history is used to determine if a message ostensibly sent to the server was not received by the server.

In an exemplary embodiment of the invention, the first 16-bit notifies the server what is the maximum ID (considering the Cyclic effect) received by user ID (ZMS message with maximum ID). The next 32 bits notify the server of the history of last 32 received ZMS messages, in an embodiment of the invention.

Each bit used is offset from the Message ID (the first 32 bits) in this way: when the first bit (from left to right) is equal to 1 this means that the message <"Message ID"-1> is missing, in an exemplary embodiment of the invention. In some embodiments, when the second bit (from the left to right) is equals to 1 this means that the message <"Message ID"-2> is missing; and so on. Using this methodology, up to previous 32 messages con be reported and traced. Naturally, more or less bits are used for the history depending on the needs or wants of the system 100 operator.

51. <Reset History> contains a 24-bit value, in some embodiments of the invention. This TLV notifies the "receiver" to reset its history and set its Message ID Counter to be equal to the 24-bit value, in an embodiment of the invention. This TLV is optionally used to correct delivery-verification errors.

52. <Client Delivery Verification Message> contains a 0-bit value and notifies the server about client's history delivery status, in an embodiment of the invention. This message is sent at least once, for example during client startup.

53. <Polling Type> contains a 3-bit value and notifies the server about polling times to be used by client, in an embodiment of the invention. In some embodiments of the invention, this is for devices which use HTTP to send and/or receive ZMS messages. This message is sent at least once per client registration (e.g. Nickname change), in an embodiment of the invention. When this TLV is not sent, the default polling is used (e.g. for devices which use HTTP for sending and/or receiving ZMS messages).

54. <Message Type> contains a 6-bit value denoting the type of the message, in an embodiment of the invention. Exemplary values for the <Message Type> TLV include:
a. Registration message
b. Registration reply message
C. Dynamic Configuration message In some embodiments of the invention, TLV fields are used to enhance system 100 support for families of communications devices, for example, having one version of client software for families of devices where all the devices in the family are at least partly related in function and/or operation.

In an embodiment of the invention, TLV fields #55-58 indicate a communication device's type and its relationship to a family of devices. In an embodiment of the invention, information indicated by fields 55-58 is saved on a database and/or used by system 100 during operation.

55. <Vendor Name> contains a string denoting the name of the vendor or service provider, in an embodiment of the invention. Optionally, this information comes from a downloaded client.

56. <ModelName> contains a string identifying the device model, in an embodiment of the invention. Optionally, this information comes from a downloaded client.

57. <HWDeviceType> contains a string identifying the device type, in an embodiment of the invention. Optionally, this information comes from the device hardware. (miroedition.platform)

58. <FamilyName> contains a string identifying the device's family, in an embodiment of the invention. Optionally, this information comes from a downloaded client.
59. <ZlangoLanguageVersion> contains a string denoting language version (e.g. zlango language). Optionally, this information comes from a downloaded client.

In some embodiments of the invention, messages are sent through system 100 with TLV fields which indicate a setting and/or configuration change in a communication device.

60. <ShortCode> contains a string denoting the short code that the handset should use, in some embodiments of the invention, for ZMS/SMS communications.
61. <ContainersLocation> some devices are very limited on Jar size, therefore in some embodiments of the invention, some content is downloaded as part of client installation and they are placed into the RMS memory. In an embodiment of the invention, <ContainersLocation> contains a string denoting the location that the handset should use for storing downloaded content
62. <HTTP> contains a string denoting the URL that the handset should use, in an embodiment of the invention, for ZMS/HTTP communications.
63. <ModeOfOperation> contains a 6-bit number denoting the mode in which the device should work with the system, in an embodiment of the invention. Exemplary values for this field are:
    10—MIDP1_NO_WMA
    11—MIDP1_WMA
    12—MIDP2_NO_WMA
    13—MIDP2_WMA
    20—BREW_Send-SMS (application can issue an SMS) No-Activation-SMS (no application activation by SMS)
    21—BREW No-Send-SMS No-Activation-SMS
    22—BREW (i.e. Send-SMS Activation-SMS)
    30—WEB_CLIENT
    31—EMAIL_CLIENT
64. <Corrupt Message Counter> contains a 6-bit number denoting the number of corrupt messages that the client has detected up until now, in an embodiment of the invention.
65. <ZRL> is adapted, in an embodiment of the invention, to resolve situations when the software client of a user device has to use a "dynamic" URL received from a sender, such as a friend or from a server or service provider. The <ZRL> field has 4-bits for type of content of the URL, 11-bits for length of URL (11 bits allows up to 1024 characters) and up to 1024 characters for the URL itself, in an embodiment of the invention. Exemplary types of ZRL include:
    0—Reserved for future uses
    1—Temporary icon (for immediately uses only)
    2—Text
    3—Image
    4—New Language
    5—New category
    6—New icon
    7—New Skin
    8—Update the client
66. <Communication Possibilities> has a 4-bit value, in an embodiment of the invention, which defines possible communication configurations of a specific user. In an embodiment of the invention, the <Communication Possibilities> is adapted to notify collocutors of a user, about that user's possible communication configurations. For example, a user that has a MIDP-2 device can communicate directly to his contacts (he can sends ZMS over SMS) however, a user that has a MIDP-1 device has to communicate through an intermediary application server. This <Communication Possibilities> information is optionally saved with a contact's nickname and/or phone number, which allows a user's device to choose the best type of communication connection to make with the specific contact. Exemplary values for the TLV field include:
    0—reserved for future uses
    1—MIDP-2 user (i.e. in the general case, user can send and receive over SMS)
    2—MIDP-1 with WMA (i.e. in the general case, user can send over SMS but can not receive over SMS)
    3—MIDP-1 without WMA (i.e. in the general case, user can not send and receive over SMS)
    values 1-3 refer to the type of MIDP, in an embodiment of the invention, but in some embodiments the values refer to any other context, such as user can communicate over SMS, but the user prefers to communicate over HTTP (for example because it's cheaper), or usually the user prefers to communicate over HTTP, but as there is no useable HTTP connection where the user is, please use SMS until otherwise informed and/or until HTTP communication can be restored.

Following is a description of various message types with the name of each field type in <> brackets. Each field type has a different value of "T" in the TLV scheme.

In an exemplary embodiment of the invention, a registration message is constructed using the following format: Protocol Version<Registration Identifier><Security Token><Device Type><Phone Number><Operator><Software Client Version Number><Language><Nickname><Message Type: Registration Request>, where:
1. <Registration Identifier> is a type which has no value—it merely indicates that the message is a registration message so its length is always 0—the length field will contain 0.
2. <Security Token> is the token described above to be used for identifying and verifying the identity of a user device.
3. <Device Type> optionally contains a string which identifies the type of user device being used. In an exemplary embodiment of the invention, it is part of the installation file and as such it is supplied as part of the client during the download.
4. <Phone Number> is the receiver's phone number. In an exemplary embodiment of the invention, the format has to be a full international number.
5. <Software Client Version Number> is optionally a Unicode string provided as part of the client during the download process.
6. <Language> is optionally a Unicode string, settable by the user.
7. <Nickname> is optionally a Unicode string, selected by the user and/or communications network system.
8. <Message Type> indicates to the server what type of message is being transmitted (as described above with respect to TLV #54), in this case a registration request.

In an exemplary embodiment of the invention, the registration message is optionally re-transmitted for updating the server in case of various events, such as changing the user name, installing special icon packages, transferring the SIM-card to a different user device, etc. The registration message is also optionally used to enable instant service in cases that an external download server is used where there may be a significant delay in generating reports on new users. In an exemplary embodiment of the invention, a response to this message is a new Security Token, which is included with subsequent messages (as described herein). The first time this registration message is sent, the Security Token is optionally a blank field (0 length).

In an exemplary embodiment of the invention, when an HTTP channel is used, this reply should come as the response to the HTTP request which sends the Registration Message. When the SMS channel is used, the reply is sent using the Registration Reply Message (see below), in accordance with some embodiments of the invention. In such an embodiment, because the phone number of the client is known and visible as part of the SMS communication, the security aspect is generally less important than in the HTTP embodiments.

In an embodiment of the invention, a registration reply message is constructed using the following format: Protocol Version<Registration Reply><Security Token><Message Type: Registration Response>. In an exemplary embodiment of the invention, an outgoing message is as follows: Protocol Version<Security Token><Destination-Phone-Number><Sender Phone Number><Sender Nickname><Message Type: Outgoing Message><ZMS Content><ZMS Delivery History><Content Check>. Although the <Sender Nickname> is optionally extracted by the server, it is inserted for optional verification purposes, such as testing using direct SMS.

In an embodiment of the invention, the <ZMS Delivery History> is encoded as TLV Field 50 and is sent with each outgoing ZMS. Optionally, <ZMS Delivery History> is merely a list of IDs (optionally, sequential numbers) corresponding to field <ZMS Message ID> assigned to each message which is preserved in a database on server 102 and/or in clients 106 and/or 110. The message receiver's client 110 and/or server 102 analyzes the <ZMS Delivery History> and compares it to the list of all the previously received ZMS IDs (considering also the cyclical of this ID, "cyclic" described below) prior to the receipt of the newest message and/or to a history located at client 106, allowing server 102 and/or client 110 to identify if a message has been missed (e.g. not received by server 102 and/or not received by client 110). For example, if there is a message ID stored in the Delivery History on the server 102 database, but not in the client 110 list it can be surmised that the message corresponding to this ID was not received at client 110. In an embodiment of the invention, messages which are determined as missing are resent by server 102 to client 110. It should be understood that delivery verification using this general method is applicable to a plurality of messaging applications and/or formats and/or protocols. For example, delivery verification as described herein could be applied to e-mail or instant messaging.

In an exemplary embodiment of the invention, an alternative outgoing message format is used which condenses the <Security Token><Destination-Phone-Number><Sender Phone Number><Sender Nickname> into a single <Header> TLV. Optionally, there are at least three varieties of <Header>, including: <Simple Header> which excludes the Sender Phone Number and the Nickname; <Header With Nickname> which excludes only the Sender Phone Number; and <Header With Nickname and Sender Phone> which includes all the fields.

In some embodiments of the invention, <Header With Nickname> is used. However, typically this is not sufficient when sending messages over HTTP, therefore in an HTTP embodiment of the invention, <Header With Nickname and Sender Phone> is used. It should be noted that in some embodiments of the invention, the "Nickname" is technically unnecessary when sending via server 102, because the server 102 knows the nickname of the Sender. However, it is included in some embodiments for redundancy.

In some exemplary embodiments of the invention, <Sender Phone Number> is included in the message when it is sent to server 102 via HTTP. In an exemplary embodiment of the invention, when the message is sent by SMS, the recipient should be able to see the sender's phone number. In some embodiments of the invention, the sender's phone number is used to match it with the security token. Alternatively, the sender's phone number is not sent and server 102 infers it from the security token.

In an exemplary embodiment of the invention, an incoming message is as follows: Protocol Version<Sender Phone Number><Sender Nickname><Message Type: Incoming Message><ZMS Content><ZMS Message ID><Content Check>. In an alternative embodiment of the invention, the <Header With Nickname> TLV is used to encode the Sender Phone Number and Sender Nickname. Note that a <Header With Nickname> also contains a Security Token. In some embodiments of the invention, server 102 uses the <Header With Nickname> field for the Security Token of the Receiving Handset. In such an embodiment, the receiver of the message can verify that the message is authentic. In an embodiment of the invention, the <ZMS Message ID> is assigned as TLV Field 49 and is received with each incoming ZMS message, allowing the client to identify if something has been missed, as described below.

In an exemplary embodiment of the invention, at least portions of system 100 are used to perform delivery verification for messages and/or data transmitted via system 100. Server 102 assigns an ID, <ZMS Message ID> in some embodiments of the invention, to each message sent from server 102 to a recipient. Optionally, this ID is cyclic, wherein IDs are selected from a finite list of IDs and when the list is exhausted for a single recipient the IDs begin a cycle through the list again. As described above with respect to incoming messages, server 102 uses TLV Field 49 for assigning message IDs, in an embodiment of the invention. <ZMS Message ID> is used in combination with <ZMS Delivery History>, described above, to determine if messages have not been delivered to the recipient. In an embodiment of the invention, when user device 10 receives a new message, the software client examines the <ZMS Message ID> and compares it to the highest ID (within the same cycle) in the <ZMS Delivery History> stored on user device 110. If the newly received ID is a later ID than all the other IDs previously received in that cycle, yet is an ID which is greater than 1 down the list, then a message must have not been received by user device 110 which was sent from server 102. In such an event, the following actions are optionally taken:

a) the software client adds the missed message(s) to a list of missed messages (up to 32 latest messages);
b) the <ZMS Delivery History> is sent to server 102 with next "outgoing" message and/or at the start of the software client;
c) this next "outgoing" message notifies server 102 that one or more messages were not received by user device 110; and/or
d) server 102 sends all missed messages (with their original ID numbers) to user device 110.

In an embodiment of the invention, when user device 110 receives one or missed messages as a result of the message(s) being resent from server 102, or for any other reason, the missed message is removed from the list of missed messages described above in a).

In an exemplary embodiment of the invention, messages are used for performing services related to the operation of system, for example to notify a recipient and/or the recipient's client application that at least one message is waiting to be retrieved at server 100. In an exemplary embodiment of the invention, a new message notification where the message does not have ZMS content is constructed in the following format: Protocol Version<Sender Phone Number><Sender Nickname><Message Type: ZMS Notification>. In some embodiments of the invention, this message is identical to an Incoming Message except the <Message Type: ZMS Notification>, and the absence of the <ZMS Content>. In some embodiments of the invention, the sender's phone number, or other identifier, is viewed using the Info window which is available via the Menu. In an alternative embodiment, the <Header With Nickname> TLV Field is used to encode the Sender Phone Number and Sender Nickname in combination.

In an embodiment of the invention, where a message is received at server 102 which does contain ZMS content, a notification message optionally is constructed according to the following format: Protocol Version<Sender-Phone-Number><Sender Nickname><Message Type: ZMS Notification with ZMS Content><ZMS Content><Content Check>. In an embodiment of the invention, this message resembles an Incoming Message except the Field <Message Type: ZMS Notification with ZMS Content>, which comes before <ZMS Content>.

Since a service message is technically a message, system 100 optionally handles Message Types which are considered as service messages so that they are not provided to a user twice, for example as the original service message and as a normal incoming message stored in a retrieval queue. In some embodiments of the invention, a check-sum of a service message is compared with the messages retrieved from server 102 and if a message is retrieved with a check-sum matching to a previously retrieved service message, this duplicate message is not provided to the user. Optionally, the duplicate message is deleted.

Outgoing service messages are also possible, in accordance with an exemplary embodiment of the invention. In some embodiments an outgoing service message is constructed in the format: Protocol Version<Security Token><Sender Phone Number><Message Type: Client Service Message><ZMS Delivery History>. As above, the Sender Phone Number only needs to be included in the message when it is sent to server 102 via HTTP. If it is sent by SMS, the recipient should be able to see the Originator Phone Number. In some embodiments, the sender phone number is included in order to match it with the security token. In an alternative embodiment of the invention, the Originator Phone Number is not sent and server 102 infers the Originator Phone Number by using the security token.

Figure 6:
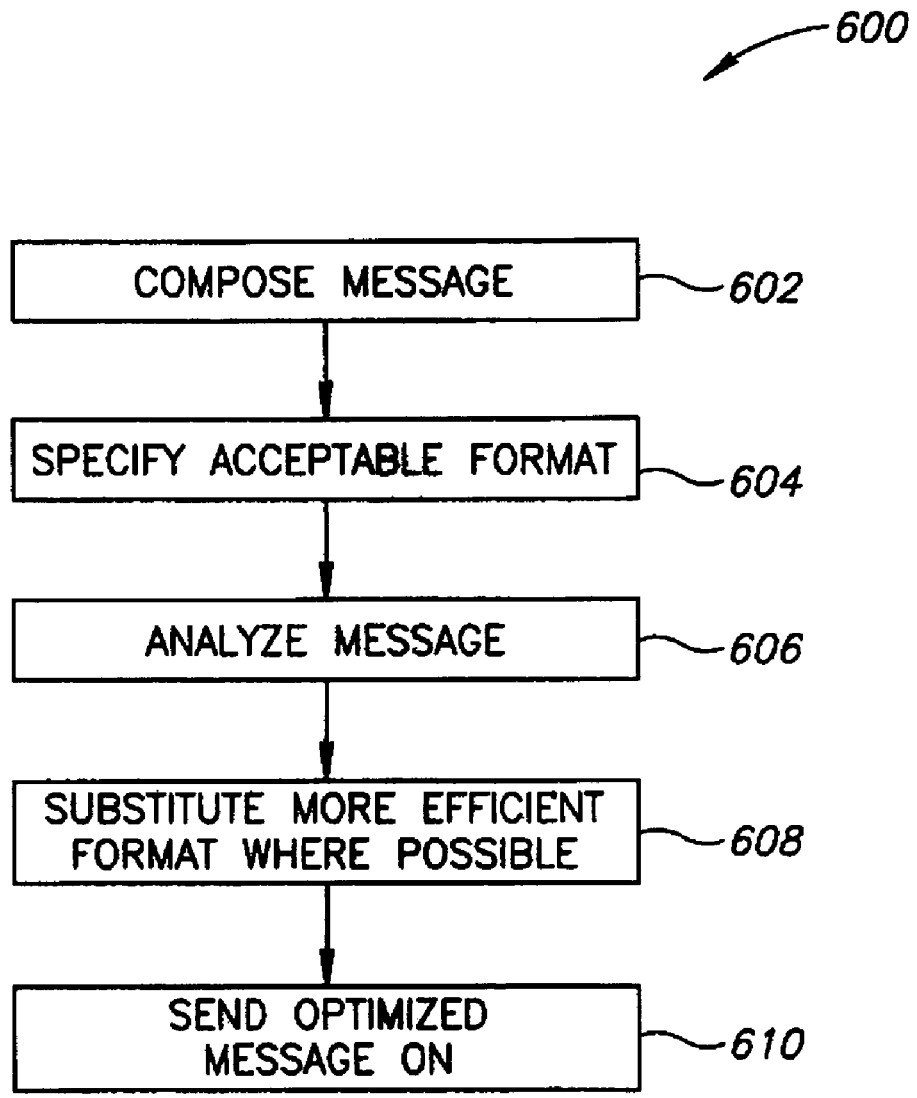
FIG. 6 is a flowchart depicting a message size optimization method, in accordance with an exemplary embodiment of the invention.

Communications network system 100 is also capable of optimizing data being transmitted in system 100, in accordance with some exemplary embodiments of the invention. FIG. 6 is a flowchart 600 of a method for optimizing message sizes, in accordance with an exemplary embodiment of the invention. After a message has been composed (602), but before it is transmitted (610) to service provider 104 or otherwise operated on by user device, there is an optional optimization stage. Any acceptable format useable by communications network system 100 is specified (604) by default for at least one element of the composed message, such as a text or iconic character. Optionally, the least efficient format in use by communications network system 100 is used. Optionally, this format is Icon-16 and/or Text-16 depending on whether the message uses icons, text or both.

Instead of putting logic in the application which chooses appropriate type-variants (Icon-9 or Icon-12, for example, or Text-7 vs. Text-16), the application optionally specifies the least efficient variant (Icon-16 or Text-16), and then has an optimizer which analyzes (606) the message contents and substitutes (608) a more efficient type where possible. In other words, if the application uses Text-16 for all text, the optimizer analyzes each character to see whether the contents use any of the higher order bits. If not, the client can simply change the chunk to use Text-7 or Text-12, depending on how many of the higher order bits are unused. The same applies to icons. In an exemplary embodiment of the invention, message size is optimized by selecting type variants which occupy less space.

As described above, messages optionally include <ZRL> TLV field information. In an embodiment of the invention, upon reading a <ZRL> field inside an SMS and/or ZMS, the software client installed on the user communications device will use an HTTP connection to access the server and retrieve (i.e. download) the content assigned to the ZRL address. The content can be normal-size ZMS, large ZMS, new icons, audio, graphics, and/or text. For SMS-only user devices, the ZRL is sent over SMS to the server and the server sends back a ZMS over ZMS (transparently opened by the client). In an embodiment of the invention, using HTTP for transferring content allows for delivery of larger amounts of information to the user device than would conventionally be possible.

As an example of ZRL usage, a user requests help on how to use the device using the GUI. A ZMS is sent to the server including a ZRL. The ZRL includes a link to an interactive menu, which is returned to the user's device via ZMS. This menu is automatically displayed by the device. The user then selects a choice from the menu and a ZMS with a ZRL is sent to the server. A ZMS is returned to the user which includes the content pointed to by the ZRL.

As another usage example for ZRLs, content for devices can be created and made accessible to user devices by assigning the content a ZRL and making the content available to users, for example by storing it on server 102 and/or on a content portal. Examples of ways the user can retrieve the content include: searching for the ZRL on the server or receiving the ZRL from the system or another device. The user then sends a ZMS with the ZRL to the server containing the content pointed to by the ZRL in order to retrieve it. Language icons, designs, pictures, art, and text are examples of content.

In an embodiment of the invention, ZRLs are used to upgrade and/or enhance the functionality of the software client installed on a user's device. For example, in the event of the user device receiving a message which includes a content element identification number (ID, as described below) which is not locally stored by the user device, the device can automatically generate and/or use a ZRL which points to a location from which the content element can be retrieved/downloaded, thereafter downloading the content element for display and/or storage on the user device.

In some embodiments of the invention, a ZRL message includes attachments, such as images or text.

Exemplary methods of use for ZRL enables messages include:
   a. attaching to a ZMS message advertisement information (for example a picture or an icon);
   b. using ZRL as an additional ZMS element (such as icons, text etc) and inserting the ZRL into the message with or without additional content; and
   c. using ZRL to update the client application with new language items, new skins, etc.

Security

Figure 7:
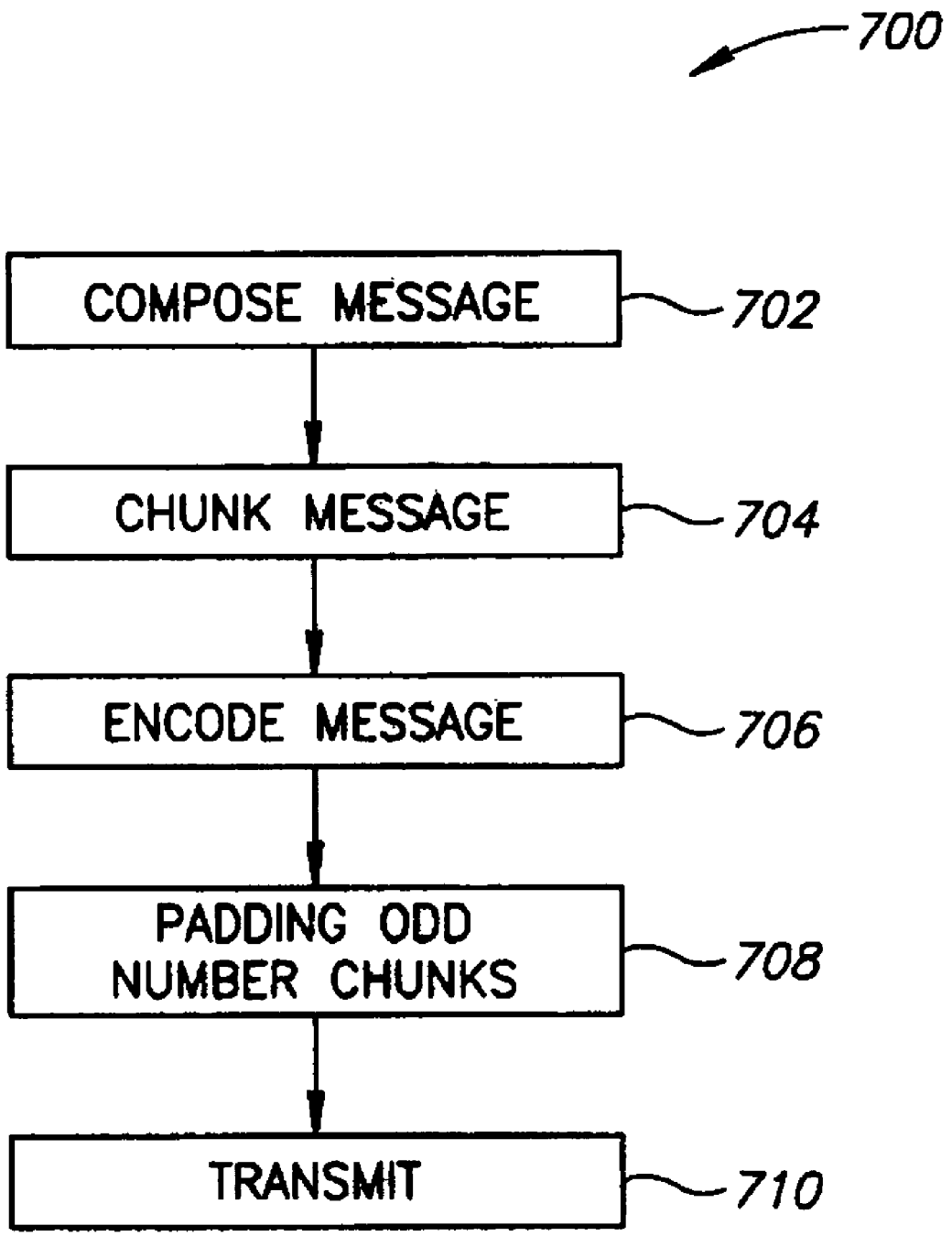
FIG. 7 is a flowchart depicting method of encoding a message, in accordance with an exemplary embodiment of the invention; and, FIG. 8 is a flowchart depicting a method of using a communications network system, in accordance with an exemplary embodiment of the invention.

In addition to the use of a security token, as described above, user devices and server 102 are capable of encoding and/or decoding messages (including iconic and text segments, when relevant) to facilitate transmitting in a format compatible with the current standards of messaging services. The process 700 of encoding/decoding an iconic message is further illustrated in FIG. 7, in accordance with an exemplary embodiment of the invention. After a message is composed (702), it is subsequently further encoded (or "channel-encoded") using URL-safe Base 64 encoding (using the A-Z, a-z, 0-9,*-, characters), to ensure safe transmission over SMS and HTTP, in accordance with an exemplary embodiment of the invention. Encoding into URL-safe Base 64 includes chunking (704) the message into 6-bit chunks, without regard to the TLV structure. In an exemplary embodiment of the invention, Base 64 encoding (706) is conducted by taking 6 bits at a time of the content of the message and mapping this to a character in the URL-safe variant of Base 64. In an exemplary embodiment of the invention, messages whose length in bits is not a multiple of 6 are right-padded (708) with "0" bits to make their length a multiple of 6. Note that in some embodiments of the invention, the values of the 6 bit chunks are interpreted as beginning with the highest order bit. So "100000" is 32, and "000001" is 1. In some exemplary embodiments of the invention, at least one header is added to the content of the message, for example to identify the format of the message and/or the recipient and/or the sender. Upon encoding the message, it is transmitted (710) in accordance with an exemplary embodiment of the invention. Decoding of the message occurs sometime prior to the recipient reading it. Optionally, decoding occurs at the recipient's device. Optionally, decoding occurs at server 102.

Billing

In some embodiments of the invention, a broker 120 is used as an intermediary for transmitting messages in system 100. Optionally, broker 120 is used to provide more cost effective message transmission in system 100. Optionally, broker 120 is used when server 102 and/or the operator of server 102 does not work directly with service provider 104, 108 or one of them. In some embodiments of the invention, a plurality of brokers is used for transmitting a message.

In some embodiments of the invention, a mix of transmission protocols/formats are used in order to provide cost effective service to users of system 100 and/or to allow for a viable profit margin for operators of and/or within system 100 and/or to provide users of system 100 with more efficient communication service (e.g. no annoying verification SMSes). It should be understood that two standard paradigms are used in order to calculate billing for SMS transmissions. The first is called MT-charge SMS, wherein a sending user is billed when an SMS is delivered to a-receiving user. This billing paradigm includes sending a verification SMS back to the sending user to verify that the SMS message was received by the receiving user. MT-charge SMS billing rates typically start at around $0.10 per message, which is typically significantly cheaper than MO-charge SMS billing, however, the verification message back to the sending user is often undesirable. MO-charge SMS billing charges for messages sent by the sending user, regardless of successful delivery and/or delivery status and therefore a verification SMS returned to the sending user is not typical, or even necessary. One drawback of MO-charge SMS billing is its higher cost, in the range of $1 per message.

One way of providing efficient service, without annoying and resource consuming verification messages, is to use MO-charge billing however, as mentioned above, this creates additional costs for the user. In order to overcome this, system 100 uses a mixed mode of transmission whereby when N+1 messages are sent, with N using HTTP for transmission and the N+1 message using the MO-charge billing paradigm. For example, take N to be equal to 10, so the total messages sent numbers 11. Charge $1.10 for these 11 messages (mostly comprised of the MO-charge cost, also includes the approximate $0.01 cost of the HTTP messages), and then average them out to give an MT-charge-like price of $0.10 per message but by actually using the MO-charge billing paradigm.

It should be noted that although it is described in this section that the MT-charge billing paradigm can be annoying to users and/or occupy resources, in some embodiments of the invention the MT-charge paradigm is used. For example, if the user prefers to have a verification message. Optionally, the MT-charge paradigm is used in conjunction with other transmission protocols and/or formats, such as HTTP.

Exemplary Methods of Use

When an iconic language software application client runs for the first time, the client optionally gets a nickname from the user and sends an activation/registration message to server 102 which includes the nickname and the device type. In some exemplary embodiments of the invention, the nickname is in English characters. The user device type information is optionally taken from the installed version (in the case of J2ME, from the JAD file). In an exemplary embodiment of the invention, this registration message is optionally resent to update the information, for example if the user wants to update their nickname and/or if the user wants to transfer their SIM to a new device.

Figure 8:
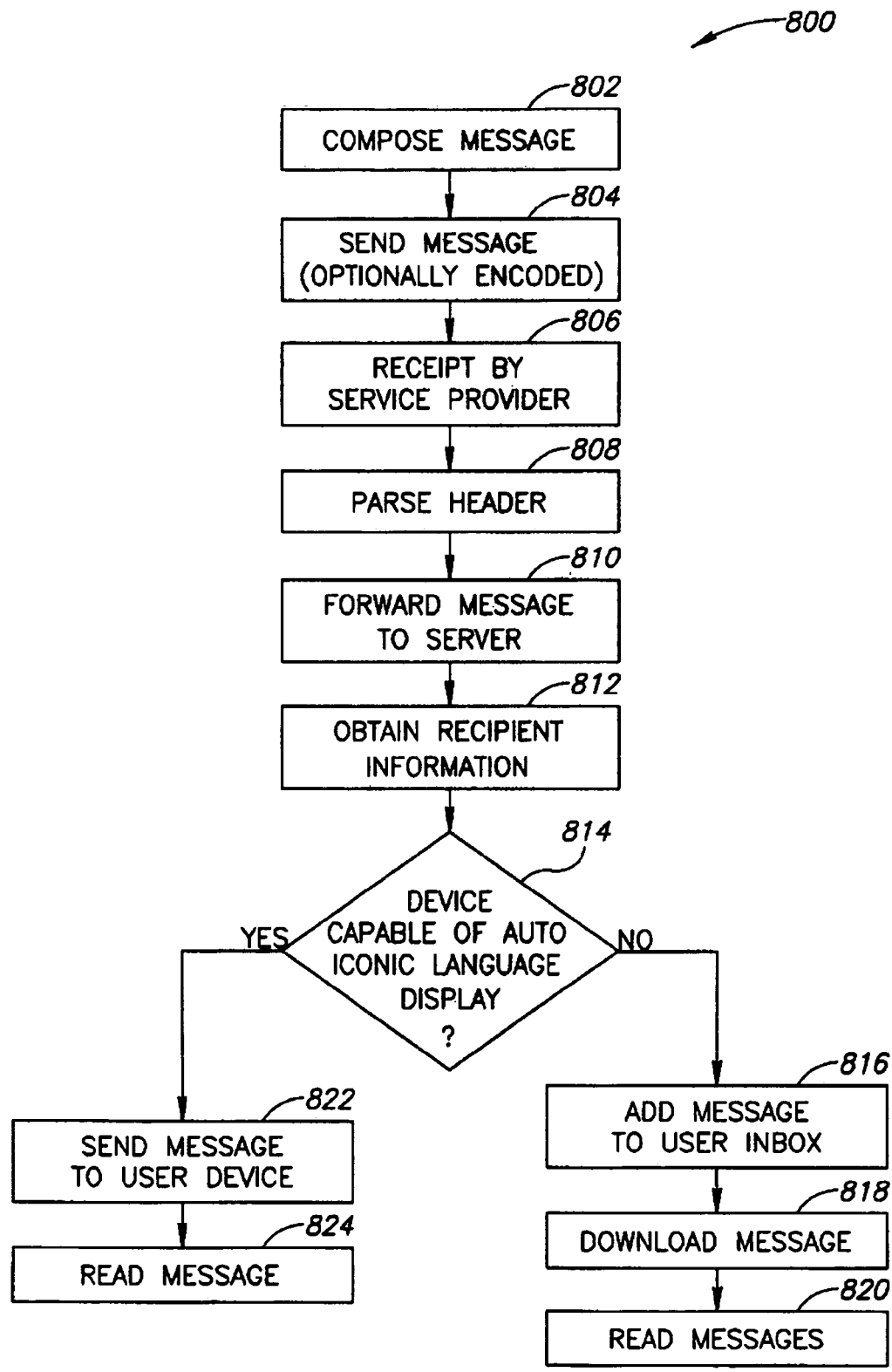

Referring to FIG. 8, a flowchart 800 is shown depicting a method of use, in accordance with an exemplary embodiment of the invention. After a user composes (802) an iconic message on a user device, the user initiates a transmission of the message, in accordance with some exemplary embodiments of the invention. The user device optionally encodes the message prior to sending (804) it, as described above. In an exemplary embodiment of the invention, the message is received (806) by service provider 104. After receiving (806) the message, service provider 104 optionally parses (808) the message header, recognizes that the message is an iconic message per special mark (e.g. port number) and forwards (810) the message to server 102 associated with service provider 104, or to the recipient's service provider 112 for further operations.

In some exemplary embodiments of the invention, server 102 identifies the recipient and obtains (812) recipient related information from the user database upon receipt of the message in order to determine how to deliver the message. For example, if a message is sent to someone's e-mail address, in accordance with an exemplary embodiment of the invention, server 102 decodes the received encoded iconic language message, creates an image file with the appropriate icons, and sends an email message to the target email address via SMTP, with the image file as an attachment to this message. In this way, standard e-mail clients are able to receive iconic messages without needing to conduct any installations, etc. Similarly, to support instant messaging, e.g. ICQ, the server optionally sends the message via the ICQ protocol, as if it were sent from another ICQ client.

In an exemplary embodiment of the invention, if the iconic language message is sent to a cellular telephone user device, server 102 attempts to determine (814) recipient device type and/or what method it is using for receiving messages. It might be, for example, CDMA BREW, MIDP or another method. In an exemplary embodiment of the invention, iconic language messages sent to a recipient who uses a device which cannot display the message (for example MIDP1 devices) may be added (816) to server 102, for example in the recipient's message inbox. In certain embodiments of the invention, server 102 informs the recipient about a new message by sending a notification message (e.g. ordinary SMS sent to the recipient's device and/or those described herein) and/or other alerts. The recipient optionally activates an iconic language messaging application and downloads (818) the message by polling server 102 ("pull" mode) in order to read (820) the message. Older generations of user devices with J2ME implementations might be lacking a WMA module that provides the option of generating an SMS from the application. In such cases, the client would optionally initiate an IP (typically HTTP or WAP) session with the server that subsequently communicates the message to the recipient. In an exemplary embodiment of the invention, if the recipient's device supports MIDP2, server 102 optionally sends (822) the iconic language message to a designated port of the device. The iconic language messaging application is automatically activated in some exemplary embodiments of the invention and the recipient optionally receives a notification and/or reads (824) the iconic language message in a manner similar to a regular SMS message ("push" mode).

In an exemplary embodiment of the invention, if the recipient's device is not empowered to display iconic language messages and/or there is any other reason why the receiver is absent in the user information database, server 102 optionally notifies the sender via service provider 104 about a delivery failure. In certain exemplary embodiments of the invention, server 102 optionally translates, as described with reference to FIG. 3, the iconic language message into a format acceptable by the recipient and sends the translated message to the recipient via service provider 104. Alternatively, server 102 creates a WAP page with a rendered image of the message for transmission to the recipient. Optionally, the WAP page is matched to various common screen sizes. Optionally, using continuation links, the rendered message is divided into consecutive pages. In some exemplary embodiments of the invention, the recipient's device is optionally identified by its profile or ID carried by the WAP transaction protocol by the UA-Prof or/and UA-Header. In an exemplary embodiment of the invention, a suitable WAP page is rendered to match the device's display and/or browsing capabilities. The WAP page also optionally contains a link to download client software from a download server 118. Alternatively to the WAP page solution, server 102 optionally notifies users that do not have a suitable user device for displaying iconic language messages that the rendered message is available for viewing at a certain Web location allowing the recipient to view it using a suitable means such as a computer connected to the Internet. Optionally, the message is sent to the recipient in text. Optionally, the message is sent to an e-mail address of the recipient.

In some exemplary embodiments of the invention, software applications are downloaded to a user device and are still capable of being used without activating the software applications at server 102 and/or without receiving a security token (as described above). For example, a software application that is downloaded to user device 106 and installed may not necessarily have to interact with server 102 in order to function, in which case the application may operate as normal strictly on user device 106. Optionally, a software application is downloaded to user device 106 to be installed and tried on a trial basis. In a trial basis exemplary embodiment of the invention, registration may only occur after the trial period has elapsed.

Identifying and Organizing Message Content

As described in more detail in PCT application being filed in the International Bureau on same date, PCT/IB07/50143 entitled "Iconic Communication", content elements, such as language icons, are assigned unique identification numbers (IDs). IDs are used to distinguish one element from another, or in an exemplary embodiment, one language icon from another. In an embodiment of the invention, unique IDs are assigned to content no matter who the creator is. When new content is created, IDs are optionally assigned based on their intended level of use, for example content which is intended to be available to the general public is assigned a general, global ID and/or content which is intended to be used by an individual user or a limited user group might be assigned a personalized ID or semi-personalized ID. In an embodiment of the invention, content with a global ID is optionally created by a service provider and/or a third party vendor. In some embodiments of the invention, content with a personalized ID is optionally created by an individual user or limited group of users.

When new content is to be assigned a personalized ID, server 102 generates a unique ID for the new content and ensures that no other ID is the same. In some embodiments of the invention, a centralized database is used for storing IDs to facilitate searching and/or storage of IDs. In some embodiments of the invention, a personalized ID is generated which includes a device specific identification element, for example a phone number of the device (and/or user) which created the content.

In an embodiment of the invention wherein the sender of the content is the same as the creator, the ID does not necessarily include the device specific identification element since it would normally already be included in a TLV field of the message. However, should the content be sent from a device which is not associated with the creator, the device specific identification element is optionally included, in an embodiment of the invention. This method allows for having personal elements shown upon ZMS received from specific contacts.

In an embodiment of the invention, IDs which include a specific identification element are stored along with the details of the user who is associated with the specific identification element.

As described in more detail in PCT application being filed in the International Bureau on same date, PCT/IB07/50143 entitled "Iconic Communication", language icons are assigned at least one name, in some embodiments of the invention. Users are allowed to rename an icon with a personalized name, in an embodiment of the invention. Optionally, a user's icon personalized name is used only on the user's device such that when a recipient of a message from the user is received, the icon uses whatever name the recipient has assigned (or the default name) to the icon not the name that the sender has assigned.

In an embodiment of the invention, icon names are used to identify message content elements without the actual icons being themselves sent. The icons to be used with the message are invoked by the names and are either provided from local storage on the user's device or an external source. Optionally, the names are used to invoke language icons in ZMS messages.

In an embodiment of the invention, "virtual" language icons are created which pair existing icons with new names and which are shared, icon+new name, amongst a group of users. Virtual language icons are transmitted to a recipient with the new name which is retained and shared by the recipient, in an embodiment of the invention. It is noted that this is different than previously described personalized names which are associated with an icon only at an individual's device. In an embodiment of the invention, virtual language icons optionally become part of a new language which is shared only amongst a limited number of users, for example a circle of friends from a rugby team.

In some embodiments of the invention, icons are arranged in categories. New categories are optionally creatable by individual users, groups of users and/or service providers and/or other third parties. Newly created categories are optionally represented by the first icon of the category and optionally the user, group and/or entity creating the category can name and populate the category, in some embodiments of the invention. In some embodiments of the invention, access to created categories is restricted to certain users, groups and/or entities. In some embodiments of the invention, transmission of limited access content to unapproved recipients is blocked at the sender's device and/or is blocked for receipt by an unapproved recipient's device. Optionally, server 102 and/or sender's device encrypts a message allowing only the sender and the approved recipient to read the message. Optionally, server 102 or the sender's device electronically signs at least some outgoing messages.

Users are provided with the flexibility to rename categories, for example on an individual user's specific device, in an embodiment of the invention. Users are also provided with the option to populate categories with content selected by them even though globally or on another user's device the content is associated with a different category, in an embodiment of the invention. In some embodiments of the invention, a user uses push and/or pull modes of communication in any of the environments described herein for receiving icons for populating categories. User created and/or populated categories can be shared with other individual users, user groups or globally, in some embodiments of the invention.

Service providers and/or content providers are also afforded the flexibility to create and/or publish and/or distribute new icons and content using any of the technologies or methodologies described herein, in an embodiment of the invention.

A user group is organized to share at least one category, in an embodiment of the invention. Optionally, a user group is comprised of friends and/or family of an individual user. Optionally, a user group is comprised of people who share a common interest. In an embodiment of the invention, content added to a group category is shared with all members of the group. The content is communicated to users of the group using any of the technologies or methodologies described herein, in an embodiment of the invention.

Exemplary Methods for Upgrading and/or Updating a Device

In an embodiment of the invention, user communication devices used with system 100, such as devices 106, 110, are content updatable and/or upgradeable in order to increase the number of features and/or the functionality of the devices. Examples of content include language icons, graphics, sounds, text, themes, applications, games, templates, pre-composed messages, categories and the like. In some embodiments of the invention, content is made available to and/or is intended for use by different audiences, including the general public, specific user groups, and/or a user individually.

In some embodiments of the invention, content is loaded onto a user device using any one or combination of the communications protocols described herein, including ZRL. In some embodiments of the invention SMS/ZMS messages are used to transfer small amounts of content, for example single or a few language icons. Optionally, a plurality of SMS/ZMS messages is concatenated and reassembled at the user device in order to provide transmission of content in parts. In some embodiments of the invention, WAP messages are used to transfer medium amounts of content, for example single to a couple dozen icons. HTTP connections, such as described elsewhere herein, are optionally used to transfer large amounts of content, for example dozens or hundreds of icons or more.

In some exemplary embodiments of the invention, a user receives a message which utilizes and/or invokes content which is not already stored locally on the user's device and therefore is retrieved from an external source for display (i.e. the device is upgraded and/or updated). In an embodiment of the invention, content retrieved from an external source for display is subsequently stored on the user's device. One way of identifying content which is not already stored locally on the user's device is by parsing an incoming message for content and checking to see if the content ID matches an ID of content already stored on the user device.

An example of content which is checked for pre-existence on the user device, in some embodiments of the invention, is language icons. As discussed herein and in applications incorporated by reference, each language icon is assigned a unique ID. In an embodiment of the invention, upon receipt by a user device of a message which invokes a language icon, incoming message icon IDs are compared with the IDs of icons already being stored on the device.

A plurality of scenarios exists for use and/or manipulation of IDs for example wherein a user personalizes an icon by assigning it a personal name. In the event that this user receives this icon, or uses this icon to compose a message, the icon itself is retrieved from a language icon and name database (comprised of icons saved at the time of client installation, in an embodiment of the invention) and the personalized name is taken from a database of personalized user information, in some embodiments of the invention. Optionally, the database for language icons and names is the same as the personalized user information database. Optionally, the personalized user information is stored locally on the user's device and/or optionally on a centralized server/database.

In another example, a language icon which is not stored locally on the user's device is downloaded from an external source, in some embodiments of the invention. As described elsewhere herein, an external source could be a service provider, a third party developer and/or a friend, as examples. In an embodiment of the invention, downloading and displaying a new icon occurs quickly and seamlessly from the perspective of the user.

In yet another example, a user personalizes an icon image while retaining the icon name. In such an embodiment of the invention, the name comes from a language icon database (comprised of icons and names saved at the time of client installation, in an embodiment of the invention) and the personalized image is taken from a database of personalized user information, in some embodiments of the invention. Optionally, the database for language icons and names is the same as the personalized user information database. Optionally, the personalized user information is stored locally on the user's device and/or optionally on a centralized server/database.

As another exemplary embodiment of the invention, an alternate image for an existing language icon is used depending on predefined preferences (for example, regional, language, individual, group or service provider preferences). In an exemplary embodiment of the invention, the language icon for "lucky" in an English speaking, western environment are dice, however the same icon for "lucky" in East Asian locales uses a dragon or the Chinese character for lucky as the alternate image for "lucky".

Initiation of content transfer to a user device potentially comes from various sources, in an embodiment of the invention, for example server 102 (and/or the service provider), from the user himself, from another user, and/or from a user group. Optionally, transfer is initiated automatically, for example if the user receives a message which is missing some content (e.g. a language icon). Optionally, transfer is initiated manually. In some embodiments of the invention, content being transferred to a device is adapted for use on that device, for example by a server.

As described above with respect to operating environments, data and/or content can be transferred to user devices using push and/or pull modes of communication. One exemplary embodiment for pushing data and/or content to user devices includes offering of special downloads or imports, for example special language icons, which are pushed to a user's device automatically by server 102 and/or a service provider. In some embodiments of the invention, the user registers and/or pays for this service for automatically delivering content.

A more specific example of content which can optionally be pushed to a user device includes icons created for special events, like holidays and birthdays. In some embodiments of the invention, new icons are automatically presented to a user, for example appearing on the display of the user's device or arriving as the contents of a message or a plurality of concatenated messages which appear when the message(s) is opened. Optionally, miniature or thumbnail versions of the icons are presented to the user, which once the user has chosen at least one icon are then delivered in a full size version. Users are also afforded the ability to have imported an entire group or category of icons, to select some icons from a group and/or to select only one icon at a time.

In some embodiments of the invention, pull modes of communication are used to update and/or upgrade user devices, for example a user navigating to a portal, website, or other connected location (using, for example, any of the communications methods described herein) and selecting specific content for download. In some embodiments of the invention, content is pulled from an exchange space, described in more detail below. Users are provided with multiple options for viewing and/or selecting and/or buying content, for example as described above, a "thumbnail" version of the content is used for previewing, in an embodiment of the invention. Another option includes selecting and/or buying and/or delivering content for other users, for example as a gift, in which case the content could either be pushed automatically to the recipient or could be pulled by the recipient upon notification.

In some embodiments of the invention, when a user receives a message which includes an icon and/or content which the user does not have stored locally, a space is left blank where that content and/or icon would have appeared (or a visual indicator that content is missing is placed there). Optionally, the user is prompted to order the content from a service provider or the like. In some embodiments of the invention, icons and/or content are locked to prevent a user from forwarding them to other users. In some embodiments of the invention, new icons are stored in a special category designated for new icons. Optionally, at least one of the icons in the new category is subsequently placed into another category by the user. In an embodiment of the invention where a category becomes full, the user can delete or move icons out of the category to make more space. Optionally, the user can create a new category.

In an embodiment of the invention, content exchange is facilitated by providing an accessible location (e.g. portal) for uploading and/or downloading and/or creating thereon content for user communication devices. By downloading content from the content exchange the abilities of the software client can be extended, for example by increasing the number of language icons available, in an embodiment of the invention. Content includes text, audio, art, games, language icons, graphics, themes and other items which might be of use and/or entertainment to users. In some embodiments of the invention, communication protocols and/or modes described herein are used to communicate with the content exchange location. The content exchange location is a network accessible location, for example by ZMS, a website or an ftp site, in some embodiments of the invention.

A content management system is optionally used for organizing the content on the content exchange location. In some embodiments of the invention, content is organized on the content exchange location, for example by categories of related content. In some embodiments of the invention, private and/or public areas of the content exchange are provided, wherein private areas are restricted to a specific user, users, group of users, or other subdivision of the global public.

In some embodiments of the invention, content on the portal is populated by at least one service provider. Optionally, users themselves (or user groups) populate the portal with content. Optionally, third parties populate the portal with content.

In some exemplary embodiments of the invention, apparatuses and methods are used with communications network system 100 such as those described in PCT application number PCT/IL2006/000061, PCT application number PCT/IL2006/000062, Israel application number 173169, U.S. Provisional application No. 60/807,855 and 60/807,863, the disclosures of which are incorporated herein by reference.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. For example, operative connections are shown between components of system 100 in FIG. 1, however it should be understood that other connections are possible depending on the implemented technology and/or software and/or the needs of system 100 operator. Variations of embodiments described will occur to persons of the art. Furthermore, the terms "comprise," "include," "have" and their conjugates, shall mean, when used in the disclosure and/or claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents, which perform the same function, even if the structure or acts are different, as known in the art. Therefore, the scope of the invention is limited only by the elements and limitations as used in the claims.

The invention claimed is:

1. A method of providing at least one icon of an iconic language to users of a server-based communications network system, comprising:

providing an iconic language converting software to user devices of the users in said communications network system;

identifying the users of said communications network system according to user information stored in a user information database;

creating a group of users comprised of at least one user, but less than all users, of said communications network system based on the user information;

providing said at least one icon to said group of users by uploading the at least one icon from an iconic language database into the devices of the group and storing the icon therein;

encoding an iconic language message into bits for uploading by a user in said group wherein the message comprises a plurality of icons including said at least one icon:

transmitting the encoded message to at least one other user in said communications network; and converting the encoded message from bits into an iconic language message including said at least one icon by at least one other user in said communications network.

2. A method according to claim 1, further comprising:
transmitting at least one iconic language message;
storing the at least one iconic language message on a database;
analyzing said at least one iconic language message; and, compiling statistics based on said analyzing.

3. A method according to claim 2, wherein said analyzing comprises determining the context of at least one icon within said iconic language message.

4. A method according to claim 2, wherein analyzing comprises determining the frequency of usage of at least one icon within said iconic language message.

5. A method according to claim 1, further comprising:
composing a message comprised of at least one message element;
placing the at least one message element in an acceptable format in use by said communications network system;
analyzing the at least one message element for the applicability of at least one more efficient format in use by said communications network system; and,
substituting said at least one more efficient format for said acceptable format to optimize the message size.

6. A method according to claim 5, wherein said acceptable format in use by said communications network system is icon-16 or text-16.

7. A method according to claim 5, wherein said at least one more efficient format is less than 16 bits but greater than 1 bit per character or icon.

8. A method according to claim 1 wherein providing said at least one icon to said group of users comprises retrieving the at least one icon from a content exchange location in the communications network system.

9. A method according to claim 1 comprising extending the iconic language by (a) populating the content exchange location system with at least one additional icon; (b) establishing communications between a user communications device and the content exchange location; and (c) downloading the at least one additional icon from the content exchange location to the user device.

10. A method according to claim 9 wherein populating the content exchange location system comprises uploading the at least one additional icon from a user communications device to the content exchange location.

11. A method according to claim 9 further comprising downloading the at least one additional icon from the context exchange location by using a pull mode of communication.

12. A method according to claim 9 comprising organizing the at least one additional icon into one or more categories of related content.

13. A method according to claim 1 comprising assigning a special meaning to the at least one icon by said group of users.

14. A method according to claim 13 comprising assigning a different meaning to the at least one icon by other users of said communication network different from said group of users.

15. A method according to claim 1 wherein converting the encoded message from bits into an iconic language message including said at least one icon includes visually affecting said at least one icon by said uploading.

16. A method according to claim 1 wherein providing said at least one icon to other user in said communications network includes transmitting the encoded message over said communications network system via short message service (SMS).

17. A method according to claim 1 wherein providing said at least one icon to other user in said communications network includes said server converting a text-based message into the encoded message.

\* \* \* \* \*